US011864035B2

(12) United States Patent
Rugeland et al.

(10) Patent No.: US 11,864,035 B2
(45) Date of Patent: Jan. 2, 2024

(54) CORE NETWORK INDICATION AND SECURITY HANDLING FOR HANDOVER

(71) Applicant: TELEFONAKTIEBOLAGET LM ERICSSON (PUBL), Stockholm (SE)

(72) Inventors: Patrik Rugeland, Stockholm (SE); Lian Araujo, Solna (SE); Oscar Ohlsson, Bromma (SE); Malik Wahaj Arshad, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/972,024

(22) PCT Filed: Jun. 4, 2019

(86) PCT No.: PCT/IB2019/054645
§ 371 (c)(1),
(2) Date: Dec. 4, 2020

(87) PCT Pub. No.: WO2019/234634
PCT Pub. Date: Dec. 12, 2019

(65) Prior Publication Data
US 2021/0250820 A1    Aug. 12, 2021

Related U.S. Application Data

(60) Provisional application No. 62/680,361, filed on Jun. 4, 2018.

(51) Int. Cl.
*H04W 36/00* (2009.01)
*H04W 36/14* (2009.01)

(52) U.S. Cl.
CPC ... *H04W 36/0038* (2013.01); *H04W 36/0022* (2013.01); *H04W 36/0077* (2013.01); *H04W 36/14* (2013.01)

(58) Field of Classification Search
CPC ............. H04W 36/0033; H04W 36/14; H04W 36/0038; H04W 36/0066; H04W 36/125;
(Continued)

(56) References Cited

U.S. PATENT DOCUMENTS

2019/0104447 A1* 4/2019 Horn ................... H04L 63/0876
2019/0182737 A1* 6/2019 Futaki .................. H04W 36/36
(Continued)

FOREIGN PATENT DOCUMENTS

EP    3477994 A1    5/2019
EP    3500048 A1    6/2019
(Continued)

OTHER PUBLICATIONS

Ericsson, Implicit CN type indication during a handover command, Tdoc R2-1804851, 3GPP TSG-RAN WG2 #101-bis, Sanya, P.R. of China, Apr. 16-20, 2018.
(Continued)

*Primary Examiner* — Allahyar Kasraian

(57) ABSTRACT

A method for a handover procedure comprises establishing a connection with a source network node of a first core network; receiving a radio resource control (RRC) message including an information element, wherein the information element indicates a second core network associated with a target network node; applying security parameters based on the second core network indicated in the information element; and performing a handover toward the target network node using the applied security parameters. The method provides an indication in RRC connection reconfiguration procedure to indicate the UE the core network of the target network node, so that the UE may recognize that this is an inter-system handover and apply corresponding security parameters for performing the handover without additional signaling.

19 Claims, 18 Drawing Sheets

(58) Field of Classification Search
CPC ............. H04W 36/36; H04W 36/0077; H04W 36/0022; H04W 36/08
See application file for complete search history.

(56) References Cited

U.S. PATENT DOCUMENTS

| | | | |
|---|---|---|---|
| 2019/0191348 A1* | 6/2019 | Futaki | H04W 36/0033 |
| 2019/0261233 A1* | 8/2019 | Duan | H04W 36/14 |
| 2019/0320368 A1* | 10/2019 | Li | H04W 36/385 |
| 2021/0297916 A1* | 9/2021 | Futaki | H04W 36/0055 |

FOREIGN PATENT DOCUMENTS

| | | |
|---|---|---|
| RU | 2585720 C2 | 6/2016 |
| WO | 2018028698 A1 | 2/2018 |
| WO | 2018029933 A1 | 2/2018 |

OTHER PUBLICATIONS

Ericsson, Solution on inter-working handover from 5G Next Gen to EPC using Nx interface, S3-170791, 3GPP TSG SA WG3 (Security) Meeting #86-Bis, Busan (South Korea), Mar. 27-31, 2017.
Ericsson, Principles of E-UTRA Handover involving CN change, Tdoc R2-1804855, 3GPP TSG-RAN WG2 #101Bis, Sanya, P.R. of China, Apr. 16-20, 2018.
Samsung, "Data forwarding for Inter-system handover from 5GS to EPS (online)", 3GPP TSG RAN WG3 #97bis R3-174177, Internet <URL: http://www.3gpp.org/ftp/tsg_ran/WG3_lu/TSGR3_97bis/Docs/R3-174177.zip>, Oct. 13, 2017.

* cited by examiner ic field of handover
CORE NETWORK INDICATION AND SECURITY HANDLING FOR HANDOVER This application is a 371 of International Application No. PCT/IB2019/054645, filed Jun. 4, 2019, which claims the benefit of U.S. Provisional Application No. 62/680,361, filed Jun. 4, 2018, the disclosures of which are fully incorporated herein by reference.

TECHNICAL FIELD

Particular embodiments relate to the field of handover signaling; and more specifically, to methods, apparatus, and systems for an intra-Radio Access Technology (RAT), inter-system handover.

BACKGROUND

As telecommunication system develops, the 5G system (5GS) defined by 3GPP Rel-15 introduces both a new radio access network (NG-RAN) and a new core network (5GC). Similar to E-UTRAN, the NG-RAN uses a flat architecture and consists of base stations, called gNBs, which are interconnected via the Xn-interface and towards the core network by the N2/N3-interface. The gNB in turn supports one or more cells which provides the radio access to the UE. The radio access technology, called next radio (NR), is orthogonal frequency-division multiplexing (OFDM) based like in LTE and offers high data transfer speeds and low latency.

It is expected that NR will be rolled out gradually on top of the legacy LTE network starting in areas where high data traffic is expected. This means that NR coverage will be limited in the beginning and users must move between NR and LTE as they go in and out of the coverage. To support a fast mobility between NR and LTE and avoid a change of core network, LTE base stations, called eNBs, may also connect to the 5GC and support the Xn interface. An eNB connected to 5GC is called a next generation eNB (ng-eNB) and is considered part of the NG-RAN.

An eNB may be connected to both EPC and 5GC at the same time. For example, the eNB is part of legacy E-UTRAN and is also an ng-eNB belonging to NG-RAN. Therefore, it is possible for UE to move between an eNB connected to EPC and an eNB connected to 5GC via an intra-RAT, inter-system handover. During such a handover, the UE remains within the same RAT (LTE) but the core network changes from EPC to 5GC or from 5GC to EPC.

Unlike an intra-system handover where the source and target eNBs can communicate directly via the X2 or Xn interface, an inter-system handover always involves the core network and is executed via the S 1 or N2 interface. This arrangement is shown in FIG. 1. During the handover, the Mobility Management Entity (MME) and Authentication Management Field (AMF) communicates via the N26 interface which is used to exchange UE context information and security-related parameters and to forward handover information between the source and target eNBs.

The interworking procedures between EPS and 5GS were designed to avoid changes to the legacy system and in particular the MME. Thus, from the MME point of view, the inter-system handover procedure is perceived as a legacy S1-based handover, which means that AMF is seen as another MME and the N26 interface is seen as the MME-MME S10 interface. A consequence of this is that the handling of the mapped security context when going from 5GS to EPS is different from going from EPS to 5GS.

FIG. 2 illustrates an inter-system handover from EPS to 5GS. FIG. 2 shows a message flow for the intra-LTE, inter-system handover from EPS to 5GS as defined in TS 23.502 (v15.1.0 [2018-03]) and TS 33.501 (v15.0.0 [2018-03]). The message flow in FIG. 2 comprises nine steps further explained as below:

1. The source eNB sends a Handover Required message to the source MME.
2. The source MME selects the target AMF and sends a Forward Relocation Request to the selected target AMF, including the EPS UE context.
3. The AMF converts the received EPS UE context into the 5GS UE context. This includes converting the EPS security context into a mapped 5GS security context. To construct the mapped 5GS security context, the target AMF derives a mapped $K_{AMF}$ key from the received $K_{ASME}$. The target AMF also derives an initial $K_{gNB}$ key from $K_{AMF}$.
4. The AMF sends a Handover Request message to the target eNB, including a Non-Access Stratum (NAS) container, the initial $K_{gNB}$, and the UE security capabilities. The NAS container includes all the information required by the UE to derive the mapped 5G security context form the 4G security context in the same way as they AMF did in Step 3.
5. The target eNB sends a Handover Request Acknowledge which includes the RRCConnectionReconfiguration message that will be transparently forwarded to the UE via the target AMF, source MME, and source eNB.
6. The AMF sends the Forward Relocation Response to the source MME.
7. The source MME sends the Handover Command to the source eNB.
8. The source eNB sends the RRCConnectionReconfiguration message constructed by the target eNB to the UE.
9. The UE applies the configuration and accesses the cell indicated in the RRCConnectionReconfiguration and sends RRCConnectionReconfigurationComplete message to target gNB.

FIG. 3 illustrates an inter-system handover from 5GS to EPS. FIG. 2 shows a message flow for the intra-LTE, inter-system handover from 5GS to EPS as defined in TS 23.502 (v15.1.0 [2018-03]) and TS 33.501 (v15.0.0 [2018-03]). The main difference compared to the other direction (EPS to 5GS) is that no NAS container is included in the handover request message from the MME to the AMF. However, the NAS container is used to create the mapped 5GS security context from the EPS security context when going from EPS to 5GS, and includes parameters, such as the selected 5GS NAS security algorithms. Since no such NAS container is provided in the handover when going from 5GS to EPS, the parameters required to create the mapped EPS security context must either be fixed or provided to the UE beforehand. The message flow in FIG. 3 comprises nine steps further explained as below:

1. The source eNB sends a Handover Required message to the source AMF.
2. The source AMF converts the 5GS UE context into the EPS UE context. This includes converting the 5GS security context into a mapped EPS security context. To construct the mapped EPS security context, the source AMF derives a mapped $K_{ASME}$ from the $K_{AMF}$ key. The source AMF also derives the initial $K_{eNB}$ key from $K_{ASME}$ and subsequently derives NH two times using vertical key derivation. The {NH, NCC=2} pair is provided to the target MME as a part of the EPS security context in the EPS UE context in the Forward Relocation Request message.

3. The source AMF selects the target MME and sends a Forward Relocation Request to the selected target MME, including the EPS UE context from Step 2.
4. The MME sends a Handover Request message to the target eNB, including the {NH, NCC=2} pair and the UE security capabilities.
5. The target eNB sends a Handover Request Acknowledge which includes the RRCConnectionReconfiguration message that will be transparently forwarded to the UE via the target MME, source AMF, and source eNB.
6. The MME sends the Forward Relocation Response to the source AMF.
7. The source AMF sends the Handover Command to the source eNB.
8. The source eNB sends the RRCConnectionReconfiguration message constructed by the target eNB to the UE.
9. The UE applies the configuration and accesses the cell indicated in the RRCConnectionReconfiguration and sends RRCConnectionReconfigurationComplete message to target gNB.

FIG. 4 illustrates a radio resource control (RRC) connection reconfiguration procedure. On the air interface, the intra-LTE handover is performed using the two-step RRC connection re-configuration procedure. The source eNB delivers the RRCConnectionReconfiguration message generated by the target eNB to the UE, which responds with a RRCConnectionReconfigurationComplete message. It has been proposed to use the RRC connection re-configuration procedure for all types of intra-RAT handovers, i.e. both intra-system (EPS-EPS or 5GS-5GS) and inter system (EPS-5GS or 5GS-EPS).

In addition to intra-LTE handover, the RRC connection re-configuration procedure is also used for inter-RAT handovers to LTE from GSM EDGE Radio Access Network (GERAN) and UMTS Terrestrial Radio Access Network (UTRAN). Note that inter-RAT handovers from GERAN and UTRAN is only supported for LTE connected to EPC, and not for LTE connected to 5GC.

FIG. 4 shows a RRCConnectionReconfiguration message defined in TS 36.331 (v15.1.0 [2018-04]). The RRCConnectionReconfiguration message enables delta configuration of the UE in intra-LTE handover, where part of current UE configuration might be kept for the connection with the target eNB. The message also supports full configuration where the previous configuration is first released before the new configuration is applied. Full configuration is used in case the target eNB does not support or does not understand the current radio configuration.

For security handling in legacy procedure, when a UE performs an intra-RAT handover, the RRCConnectionReconfiguration message defined in TS 36.331 (v15.0.1 [2018-01]) includes the security algorithms to be used (securityAlgorithmConfig), the key change indicator (keyChangeIndicator) and the NCC value (nextHopChainingCount). The latter two parameters are used to derive $K_{eNB}$ for EPS and $K_{gNB}$ for 5GS key as defined in TS 33.401 (v15.3.0 [2018-03]) and TS 33.501 (v15.0.0 [2018-03]), respectively.

When a UE performs an inter-RAT handover, the RRCConnectionReconfiguration message includes the security algorithms to be used (securityAlgorithmConfig) and the NAS container (nas-SecurityParamToEUTRA), consisting of a 5 octet $NONCE_{MME}$ used to derive $K_{eNB}$ key as defined in [TS 33.401]. An example RRCConnectionReconfiguration message is shown in Table 1 below.

TABLE 1

| RRCConnectionReconfiguration message |
|---|
| -- ASN1START |
| ------------- |
| Omitted Parts |
| ------------- |
| Security ConfigHO ::=    SEQUENCE {<br>   handoverType             CHOICE {<br>     intraLTE               SEQUENCE {<br>       security AlgorithmConfig    Security Algorithm Config    OPTIONAL, -- Cond fullConfig<br>       keyChangeIndicator          BOOLEAN,<br>       nextHopChainingCount        NextHopChainingCount<br>     },<br>     interRAT               SEQUENCE {<br>       security AlgorithmConfig    Security AlgorithmConfig,<br>       nas-Security Param ToEUTRA  OCTET STRING (SIZE(6))<br>     }<br>   },<br>   ...<br>} |
| ------------- |
| Omitted Parts |
| ------------- |
| -- ASN1STOP |

There are certain challenges in the current inter-system handover procedures. For example, when performing intra-LTE, inter-system handover, there is no indication for the UE of the target core network, which is needed for RRC procedures related to this handover. Further issues arise from the fact that intra-RAT, inter-system handover procedures in LTE do not enable the signaling of NAS security parameters, which must be included for the handover from LTE connected to EPC to LTE connected to 5GC, while there is no indication in the RRC procedures of when a mapping of security context should be performed for inter-system handover within LTE.

SUMMARY

To address the foregoing problems with existing solutions, disclosed are methods, a user equipment (UE), a network node, and a system, to perform an intra-RAT, inter-system handover with an indication in an RRC message indicating a target core network and security parameters. The present disclosure implements a solution to indicate a user equipment (UE) the target core network and the security parameters before performing an intra-RAT, inter-system handover, by including a modified or new information element (IE) in the RRCConnectionReconfiguration message. When the UE receives such RRCConnectionReconfiguration message, the UE may recognize a type of the target core network and receive the security parameters which are either included in the IE or are mapped to the target core network, so that the UE may perform a handover between EPC and 5GC correctly and without extra operations in network, such as retrieving security parameters from the target core network.

Several embodiments are elaborated in this disclosure. According to one embodiment of a method for a handover procedure, the method comprises establishing a connection with a source network node of a first core network. The method further comprises receiving a radio resource control (RRC) message including an information element, wherein the information element indicates a second core network associated with a target network node. The method additionally comprises applying security parameters based on the second core network indicated in the information element. The method yet further comprises performing a handover towards the target network node using the applied security parameters.

In one embodiment, the source network node and the target network node provide a first radio access network to a user equipment. In one embodiment, the first core network is 5G Core Network (5GC) and the second core network is Evolved Packet Core (EPC). In another embodiment, the first core network is EPC and the second core network is 5GC.

In one embodiment, the applying step comprises receiving an indication from an access stratum (AS) layer to a non-access stratum (NAS) layer, mapping 5G System (5GS) security parameters to Evolved Packet System (EPS) security parameters, and applying the EPS security parameters. In another embodiment, the applying step comprises receiving NAS security parameters included in the information element and applying the NAS security parameters.

In one embodiment, the RRC message including the information element is received from the source network node.

According to one embodiment of a method for a handover procedure, the method comprises determining that a user equipment is going to perform a handover from a source network node of a first core network to a target network node of a second core network. The method further comprises sending a RRC message including an information element to the user equipment, wherein the information element indicates the second core network associated with the target network node. The method additionally comprises performing the handover towards the target network node.

In one embodiment, the source network node and the target network node provide a first radio access network to a user equipment. In one embodiment, the first core network is 5GC and the second core network is EPC. In another embodiment, the first core network is EPC and the second core network is 5GC.

In one embodiment, the information element further comprises NAS security parameters.

In one embodiment, determining that the user equipment is going to perform the handover comprises receiving a handover required message from the source network node.

In one embodiment, the RRC message including the information element is sent from the source network node.

According to an embodiment of a UE for a handover procedure, the UE comprises at least one processing circuitry and at least one storage that stores processor-executable instructions, when executed by the processing circuitry, causes the UE to establish a connection with a source network node of a first core network. The UE further receives a RRC message including an information element. The information element indicates a second core network associated with a target network node. The UE yet further applies security parameters based on the second core network indicated in the information element. The UE additionally performs a handover towards the target network node using the applied security parameters.

According to an embodiment of a network for a handover procedure, the network node comprises at least one processing circuitry, and at least one storage that stores processor-executable instructions, when executed by the processing circuitry, causes a network node to determine that a user equipment is going to perform a handover to a target network node of a second core network. The network node further sends a RRC message including an information element to the user equipment. The information element indicates the second core network associated with the target network node. The network node yet further performs the handover towards the target network node.

According to an embodiment of a communication system for a handover procedure, the communication system comprises at least one network node and at least one user equipment. The UE comprises at least one processing circuitry configured to establish a connection with a source network node of a first core network. The source network node comprises at least one processing circuitry configured to determine that the user equipment is going to perform a handover to a target network node of a second core network. The source network node further sends a RRC message including an information element to the user equipment. The information element indicates the second core network associated with the target network node. The UE further receives the RRC message including the information element. The UE yet further applies security parameters based on the second core network indicated in the information element. The UE additionally performs the handover towards the target network node using the applied security parameters.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide an efficient solution to perform an intra-RAT, inter-system handover between EPS and 5GS. In this way, the UE may be able to recognize what target core network is and to receive corresponding security parameters before performing the intra-RAT, inter-system handover, so that unnecessary operations and configurations in the network may be avoided and the performance of the network may then be improved.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The current RRC connection reconfiguration procedures only support legacy intra-RAT, inter-system handover procedures, such as between GERAN, UTRAN, and EPC. When the intra-RAT, inter-system handover is performing between EPC and 5GC, there is no indication in the RRC connection reconfiguration procedures for the UE to understand what the target core network is. Furthermore, the UE cannot properly receive or map security contexts to perform in the handover because legacy intra-LTE handover procedures do not enable to signal the security contexts to the UE. Particular embodiments of the present disclosure provide a method to include a new information element or modify an existing information element (IE) in an RRC message in the RRC connection reconfiguration procedure, so that the UE may recognize the target core network and obtain its corresponding security parameters when the UE receives the RRC message.

Particular embodiments disclosed herein are proposed to indicate a target core network (EPC or 5GC) when performing an intra-LTE, inter-system handover, to enable proper RRC procedures related to the corresponding target core network. Moreover, particular embodiments disclosed herein are proposed for handling mapped security contexts when performing an intra-RAT, inter-system handover from 5GC to EPC. This includes indicating to the UE how and when the security contexts should be mapped and conveying the 5GS NAS security container in legacy RRC message structure.

One method disclosed herein is indicating the target core network when performing an intra-LTE, inter-system handover, by using fullconfig and 5GC specific parameter, e.g. SDAP-config, to deduce the target core network. Another method disclosed herein is indicating how to signal the NAS security parameters to perform procedures for mapped security context related to handover from EPC to 5GC, by using an inter-RAT option in SecurityConfigHO IE to signal NAS security parameters and indicating when to map the security context from EPC to 5GC. Yet another method disclosed herein is indicating how and when to perform procedures for mapped security context related to handover from 5GC to EPC, by reusing existing intraLTE option from SecurityConfigHO IE in RRCConnectionReconfiguration message, together with a target core network indication. An additional embodiment is using extended RRC message structures with new IEs to indicate the target core network and security contexts.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
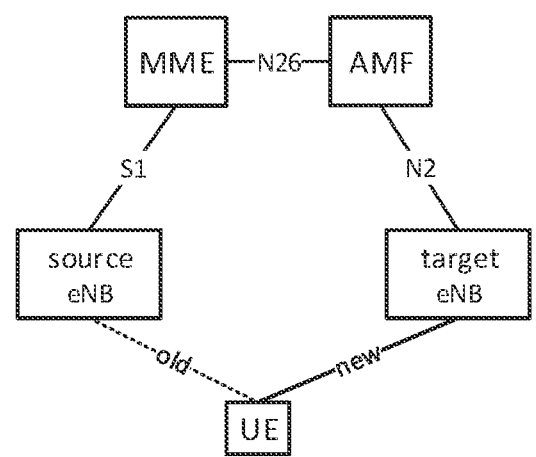
FIG. 1 illustrates a block diagram of an example inter-system handover from Evolved Packet System (EPS) to 5G System (5GS)
Figure 2:
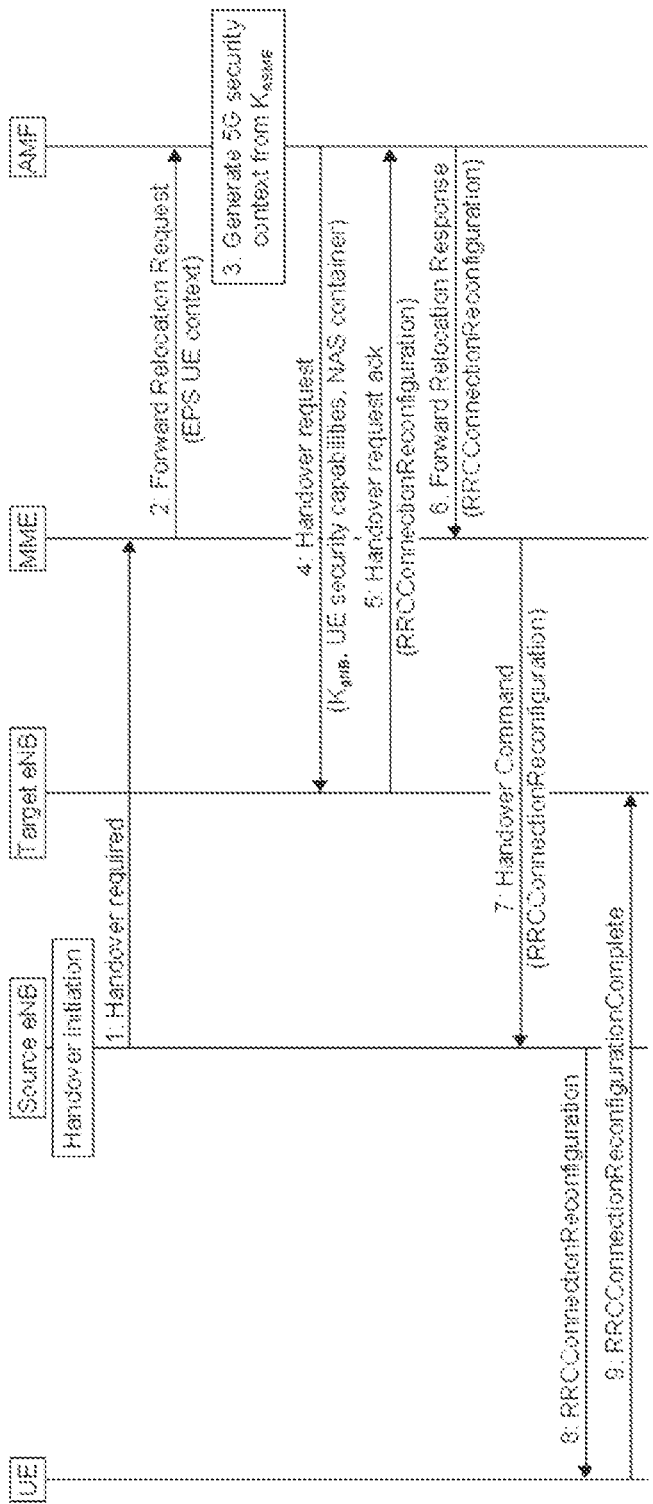
FIG. 2 illustrates a message flow diagram of an example intra-LTE, inter-system handover from EPS to 5GS.
Figure 3:
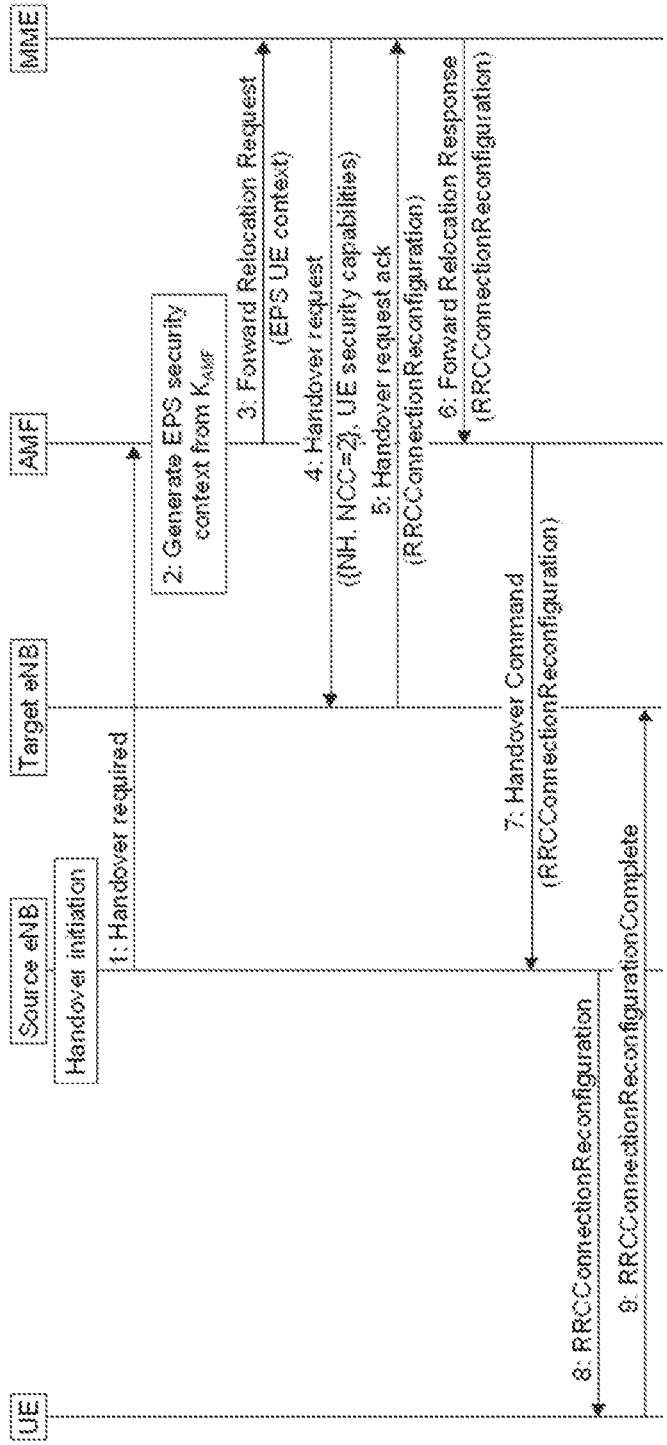
FIG. 3 illustrates a message flow diagram of an example intra-LTE, inter-system handover from 5GS to EPS.
Figure 4:
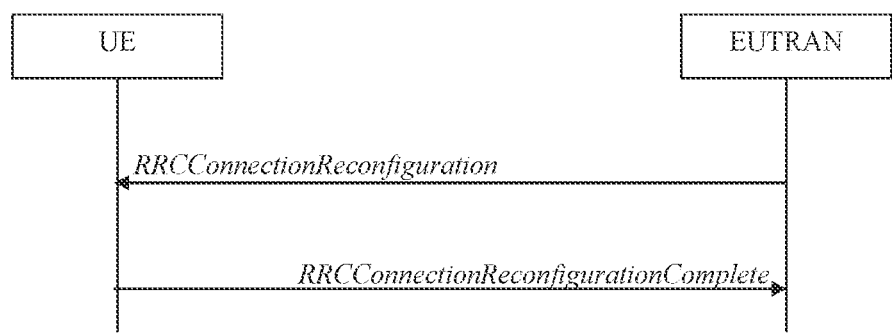
FIG. 4 illustrates an example RRC connection reconfiguration procedure; RRC
Figure 5:
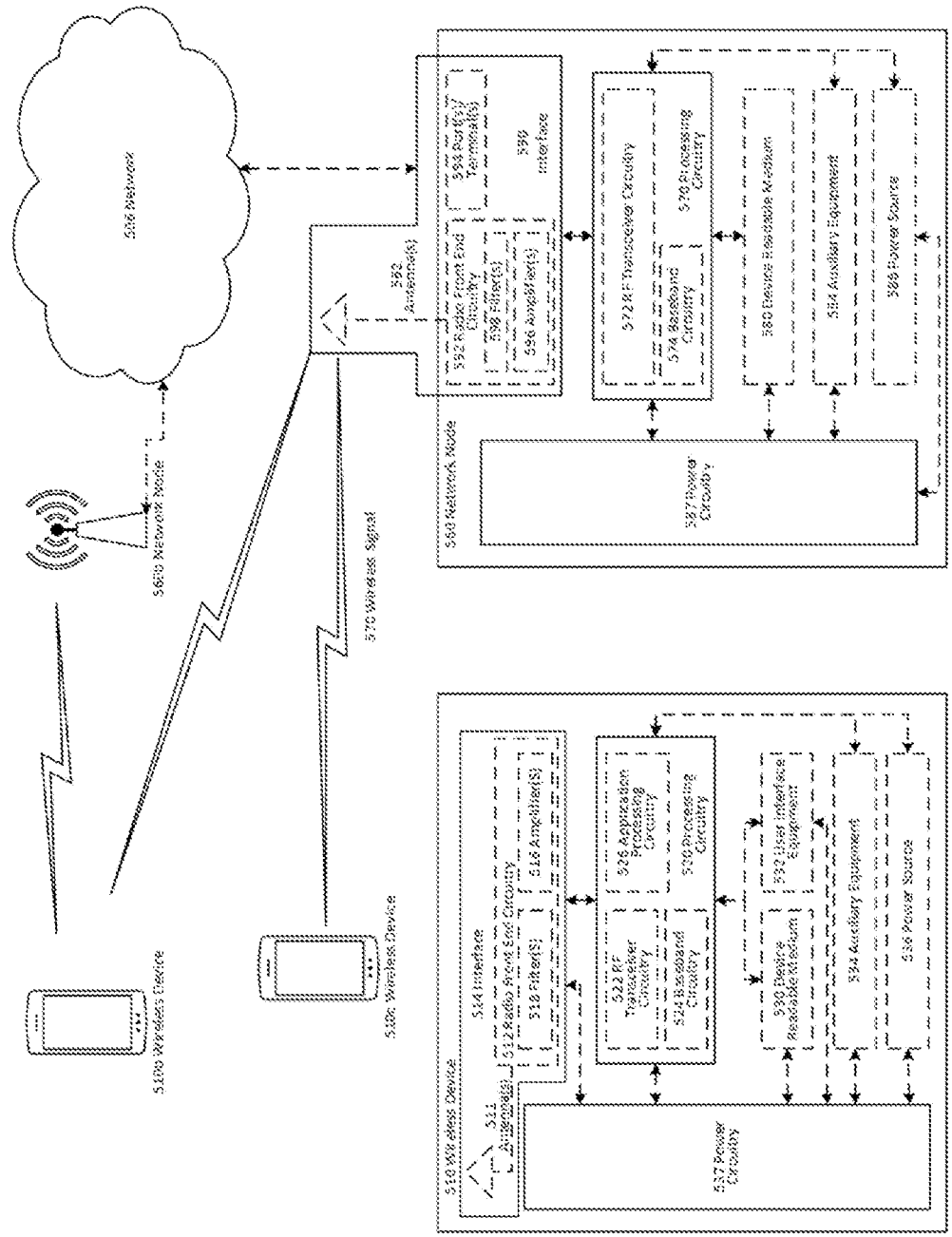
FIG. 5 illustrates an example wireless network, according to certain embodiments.

FIG. 5 is an example wireless network, in accordance with certain embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560b, and wireless devices (WDs) 510, 510b, and 510c. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. In some embodiments, the network node 560 may be a base station, such as an eNB. In the present disclosure, the term eNB may be used to refer to both an eNB and a ng-eNB unless there is a specific need to distinguish between the two. In certain embodiments, the network node 560 may be a network node, which is further illustrated in FIG. 18. In certain embodiments, the network node 560 may be a source network node. In certain embodiments, the network node 560 may be a target network node. In certain embodiments, the wireless device 510 may be a user equipment, which is further illustrated in FIG. 17. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 588, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. In particular embodiments, the processing circuitry 570 of the network node 560 may perform a method which is further illustrated in FIGS. 14 and 16. The benefits provided by such functionality are not limited to processing circuitry 570 alone or to other components of network node 560 but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signaling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 510 may be a user equipment which is further depicted in FIG. 17. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein. In particular embodiments, the processing circuitry 520 of the WD 510 may execute instructions to perform measurements for certain cells in the network 506, which is further illustrated below. In particular embodiments, the processing circuitry 520 of the wireless device 510 may perform a method which is further illustrated in FIGS. 14 and 15.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionalities described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
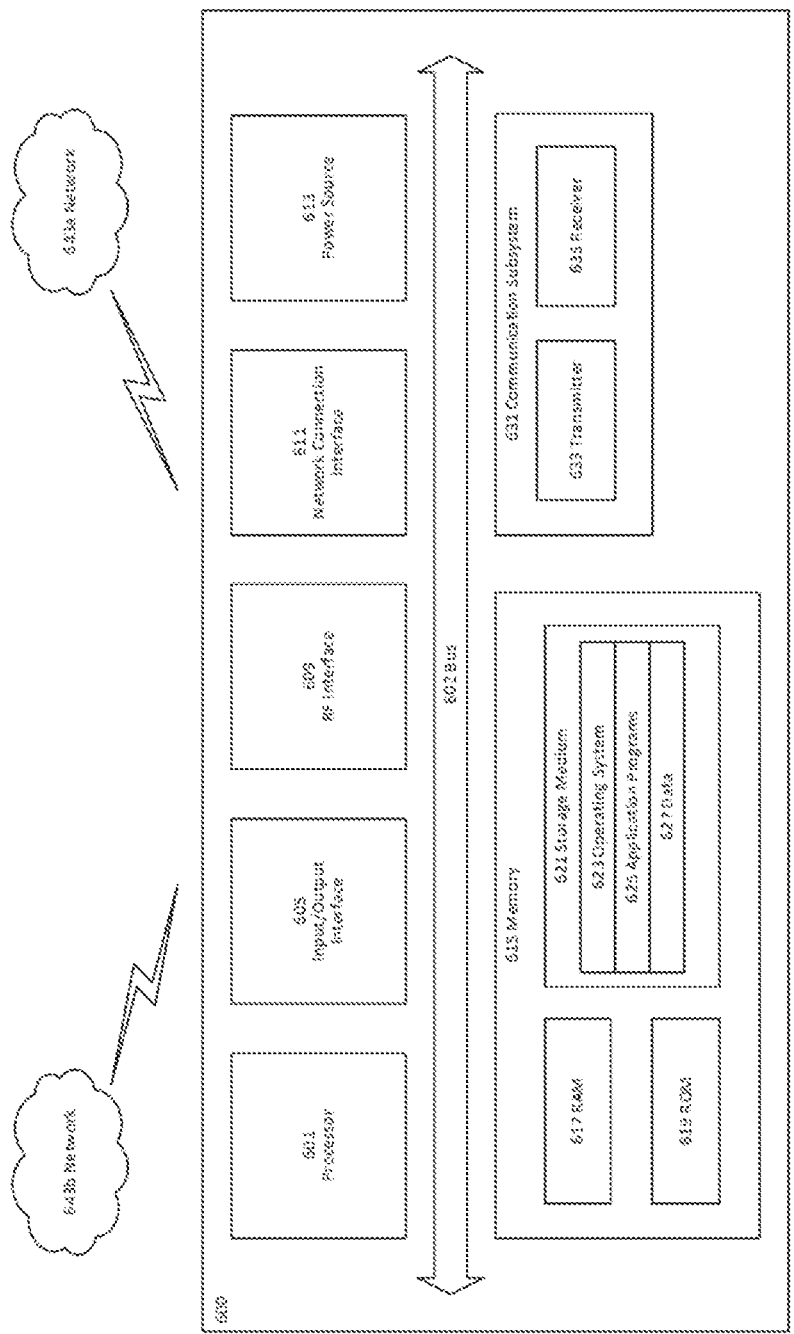
FIG. 6 illustrates an example user equipment, according to certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the 3rd Generation Partnership Project (3GPP), including a NB-IoT UE, a MTC UE, and/or an enhanced MTC (eMTC) UE. UE 600, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 600 may be a user equipment which is further depicted in FIG. 17. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer. In certain embodiment, processing circuitry 601 may perform a method which is further illustrated in FIGS. 14 and 15.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
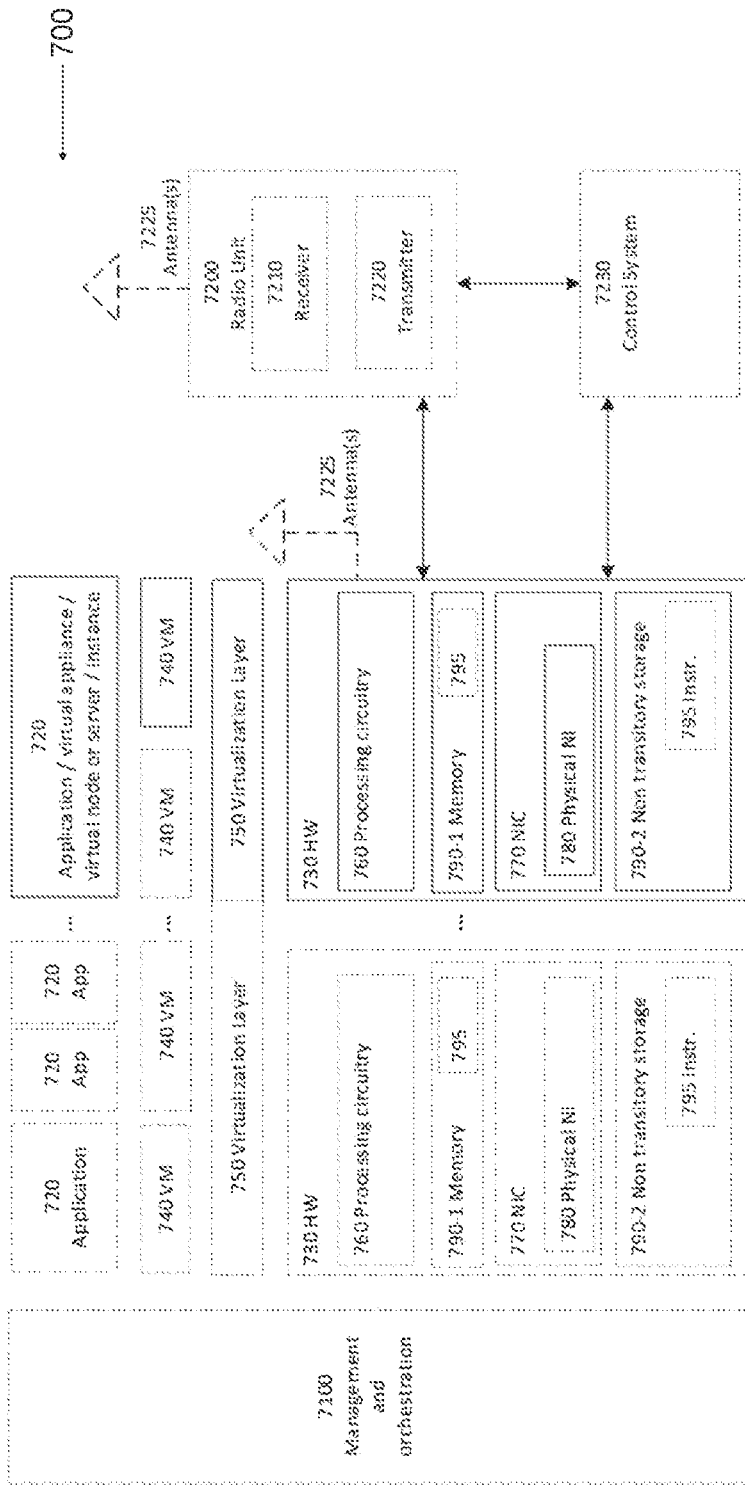
FIG. 7 illustrates an example virtualization environment, according to certain embodiments.

FIG. 7 illustrates an example virtualization environment, according to certain embodiments. FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signaling can be affected with the use of control system 7230 which may alternatively be used for communication between the hardware nodes 730 and radio units 7200.

Figure 8:
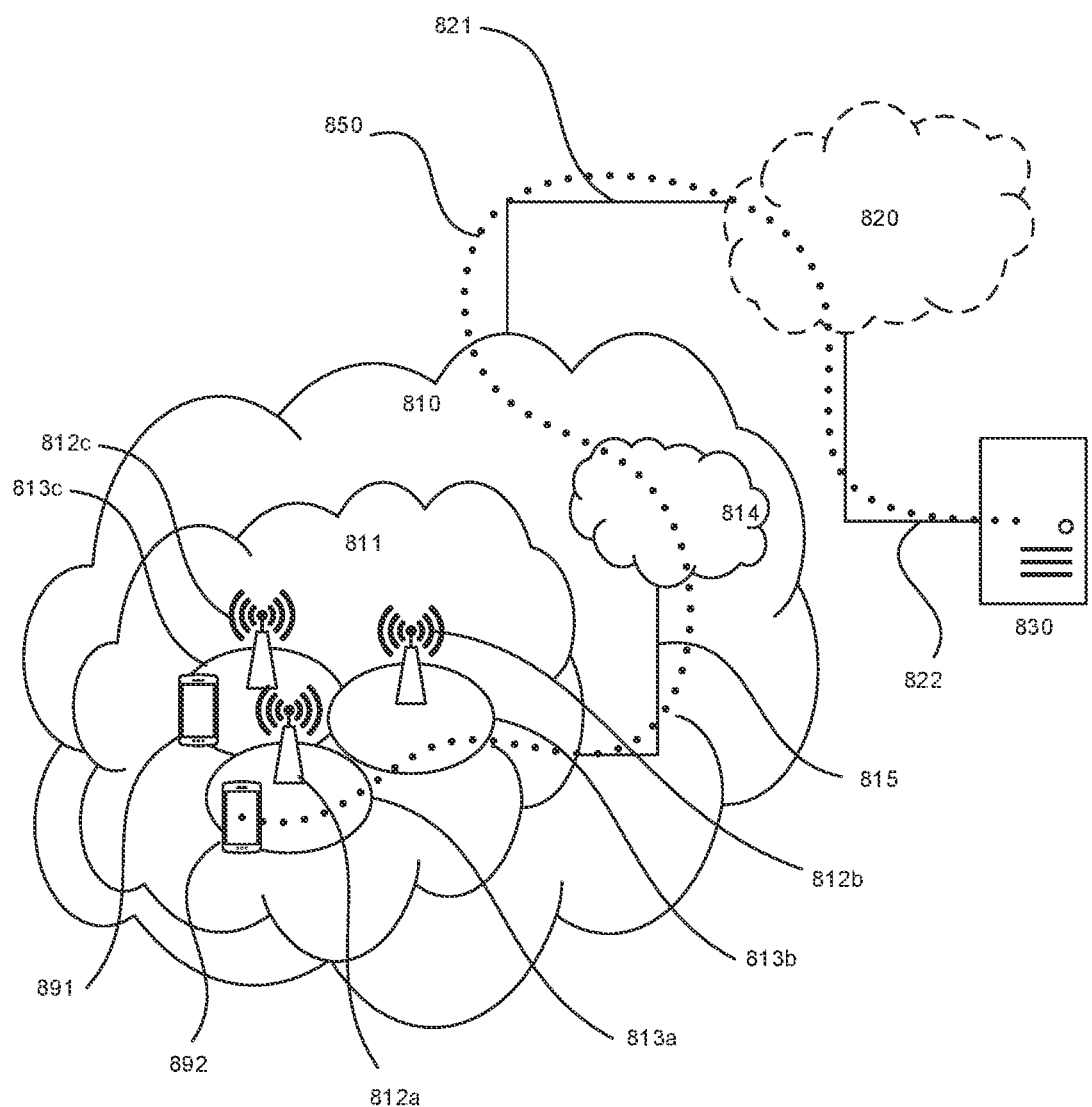
FIG. 8 illustrates an example telecommunication network connected via an intermediate network to a host computer, according to certain embodiments.

FIG. 8 illustrates an example telecommunication network connected via an intermediate network to a host computer, according to certain embodiments. With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812. In certain embodiments, the plurality of UEs 891, 892 may be a user equipment as described with respect to FIG. 17.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more sub-networks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Figure 9:
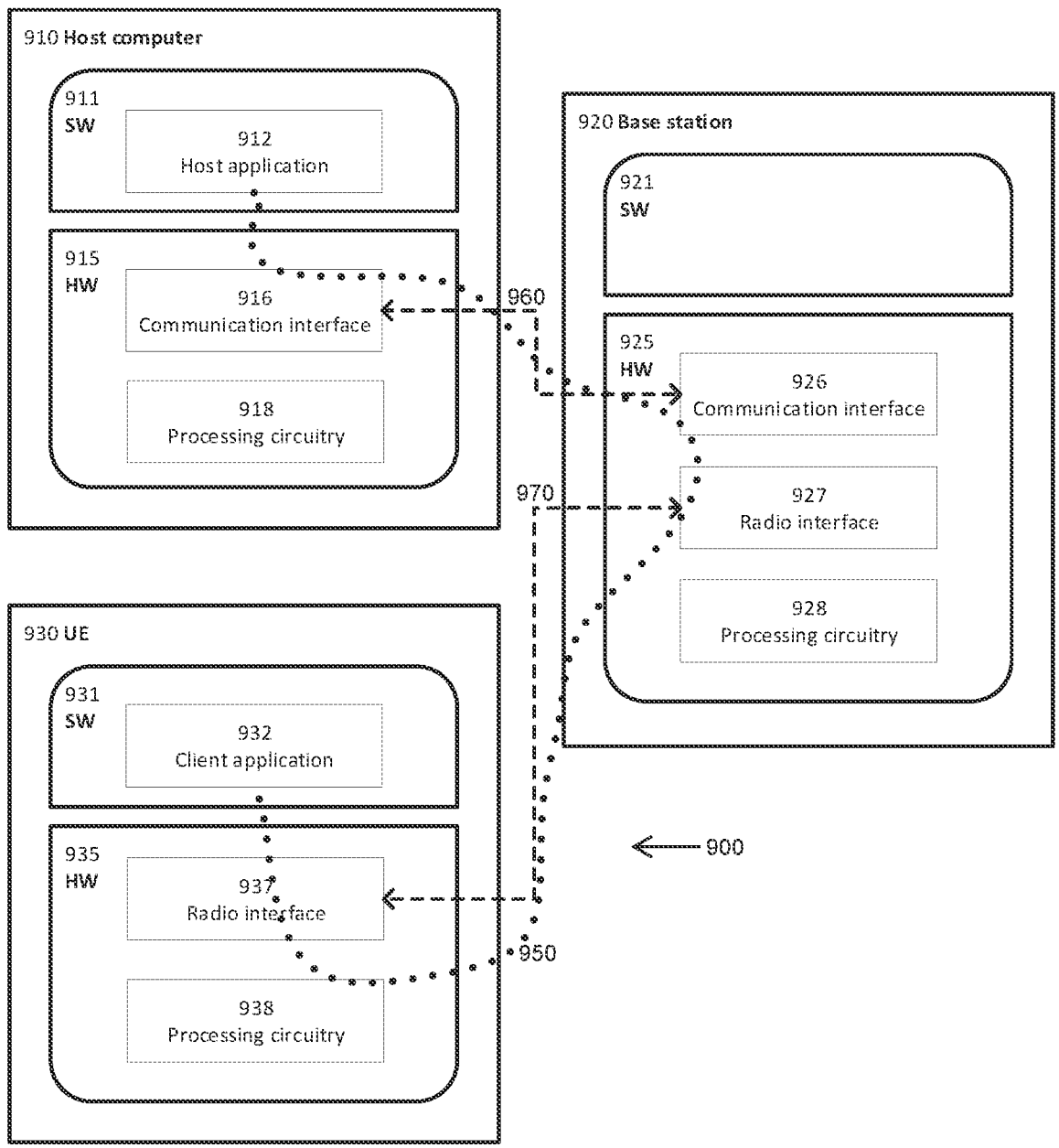
FIG. 9 illustrates an example host computer communicating via a base station with a user equipment over a partially wireless connection, according to certain embodiments.

FIG. 9 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. In certain embodiments, the UE 930 may be a user equipment as described with respect to FIG. 17. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. In certain embodiments, the UE 930 may be the user equipment as described with respect to FIG. 17. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
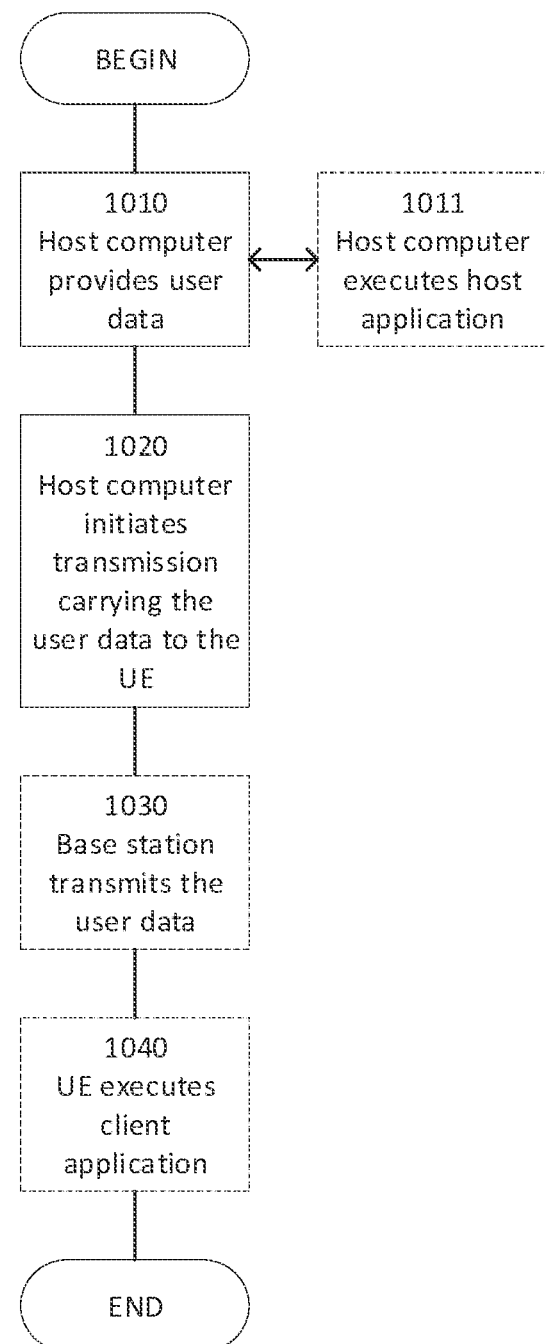
FIG. 10 illustrates an example method implemented in a communication system including a host computer, a base station and a user equipment, according to certain embodiments.

FIG. 10 illustrates an example method implemented in a communication system including a host computer, a base station and a user equipment, according to certain embodiments in accordance with some embodiments. More specifically, FIG. 10 is a flowchart illustrating a method implemented in a communication system, in accordance with one embodiment. The communication system includes a host computer, a base station which may be a network node described with reference to FIG. 18, and a UE which may be a user equipment described with reference to FIG. 17. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
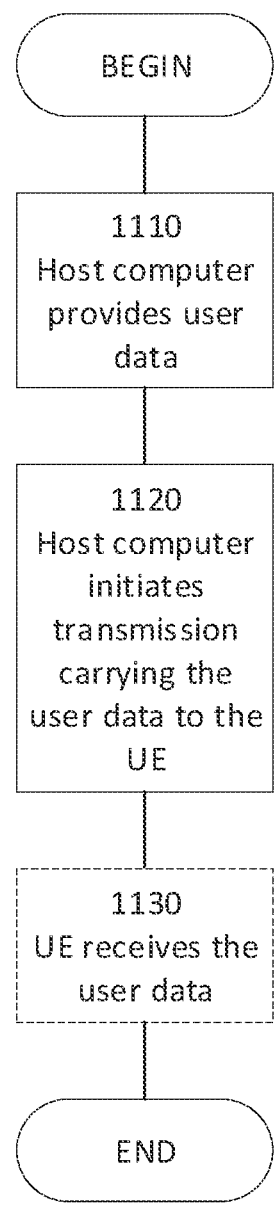
FIG. 11 illustrates another example method implemented in a communication system including a host computer, a base station and a user equipment, according to certain embodiments.

FIG. 11 illustrates an example method implemented in a communication system including a host computer, a base station and a user equipment, in accordance with some embodiments. More specifically, FIG. 11 is a flowchart illustrating a method implemented in a communication system, in accordance with one embodiment. The communication system includes a host computer, a base station which may be a network node described with reference to FIG. 18, and a UE which may be a user equipment described with reference to FIG. 17. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
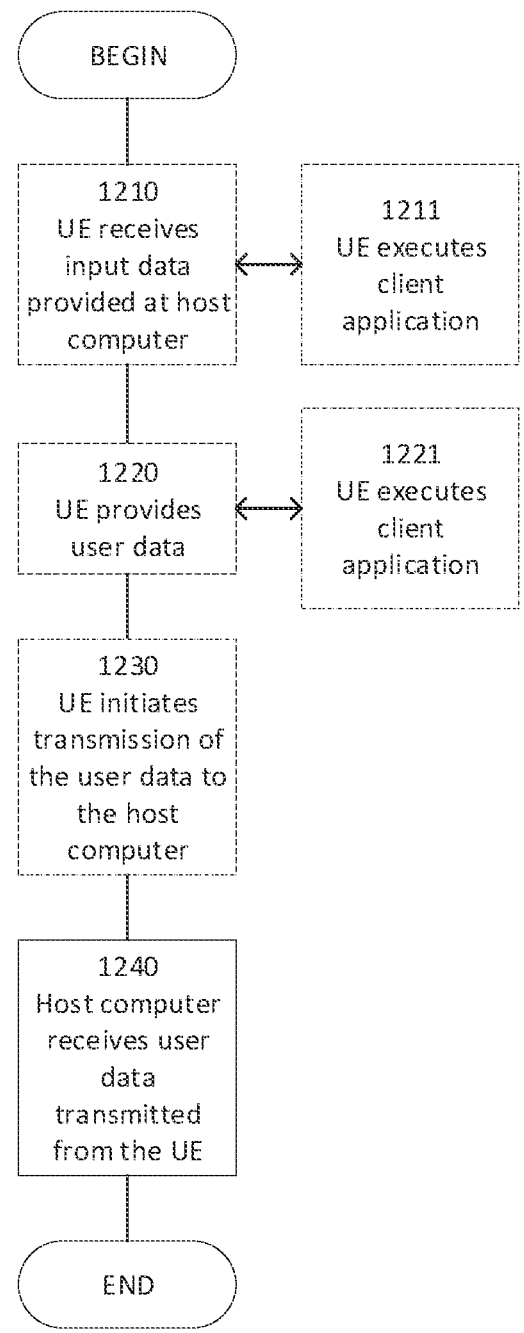
FIG. 12 illustrates another further example method implemented in a communication system including a host computer, a base station and a user equipment, according to certain embodiments.

FIG. 12 illustrates another further example method implemented in a communication system including a host computer, a base station and a user equipment, in accordance with some embodiments. More specifically, FIG. 12 is a flowchart illustrating a method implemented in a communication system, in accordance with one embodiment. The communication system includes a host computer, a base station which may be a network node described with reference to FIG. 18, and a UE which may be a user equipment described with reference to FIG. 17. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
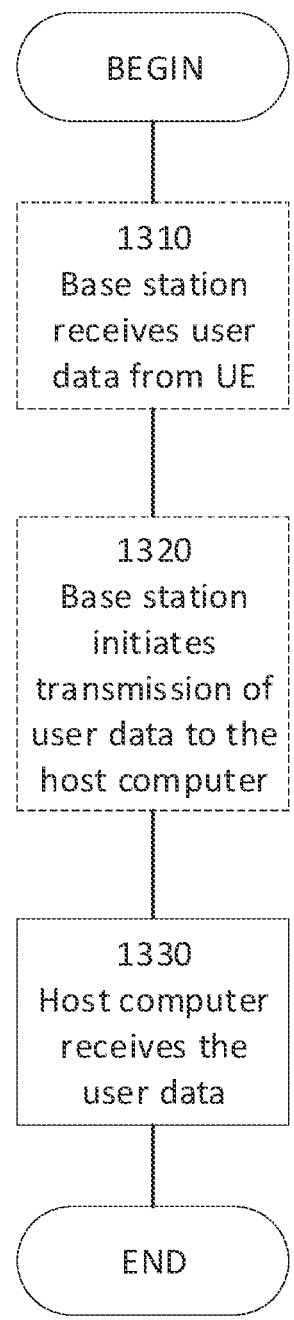
FIG. 13 illustrates another yet example method implemented in a communication system including a host computer, a base station and a user equipment, according to certain embodiments.

FIG. 13 illustrates another example method implemented in a communication system including a host computer, a base station and a user equipment, in accordance with some embodiments. More specifically, FIG. 13 is a flowchart illustrating a method implemented in a communication system, in accordance with one embodiment. The communication system includes a host computer, a base station and a UE. In one embodiment, the base station may be a network node described with references to FIG. 18. In one embodiment, the UE may be a user equipment described with reference to FIG. 17. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Building around the elements in the network illustrated above, three issues have been identified in the RRC procedures for an intra-RAT, inter-system handover between EPC and 5GC. These issues are related to indicating the target core network, handling of the mapped security context in an inter-system handover from EPC to 5GC, and handling of the mapped security context in an inter-system handover from 5GC to EPC.

For each of these problems, particular embodiments disclosed in the present application consider using existing RRC message structure, extending the RRC structure, and introducing new parameters to solve the problems.

The methods for an inter-system handover from EPC to 5GC may be adopted independently from any other methods. The methods for an inter-system handover from 5GC to EPC may require a target CN indication if the methods using an existing RRC message structure are used. In some embodiments, the methods disclosed in the present application may apply to all kinds of handover, such as intra-LTE, intra-system handovers in both directions and intra-LTE, inter-system handovers in both directions.

Regarding particular embodiments which reuse an existing RRC message structure for intra-system and inter-system handovers within LTE, since a UE connected to either EPC or 5GC may perform a handover to either EPC or 5GC and each handover requires a different UE procedure, there is a need to differentiate between intra-system and inter-system handovers.

When performing a handover from LTE connected to EPC to LTE connected to 5GC, the UE will receive configurations from LTE connected to 5GC, which implies in the inclusion of SDAP-config in RRCConnectionReconfiguration message. The mandatory presence of SDAP configuration may be deduced from the following statements:
1. "For each UE, 5GC establishes one or more PDU Sessions" from section 12 of TS 38.300 (v15.1.0 [2018-03]);
2. "For each UE, the NG-RAN establishes one or more Data Radio Bearers (DRB) per PDU Session." from section 12 of TS 38.300 (v15.1.0 [2018-03]);

3. For DRB setup in LTE connected to 5GC, the mandatory field cnAssociation contains a choice between eps-BearerIdentity or SDAP-config, as specified in the RadioBearerConfig IE, from section 6.3.2 of TS 38.331 (v15.1.0 [2018-03]); and
4. The cnAssociation filed is described as "Indicates if the bearer is associated with the eps-bearerIdentity (when connected to EPC) or SDAP-Config (when connected to 5GC)", in section 6.3.2 of TS 38.331 (v15.1.0 [2018-03]).

Furthermore, statement 4 above reinforces that SDAP-config is not used for configuration from LTE connected to EPC. However, since SDAP-config can be optionally present for handover within LTE connected to 5GC, the presence check of fullConfig in RRCConnectionReconfiguration message must also be included to enable the CN indication during the intra-LTE handover. The presence check of fullConfig can be justified by the fact that when it is included, it indicates that previous DRB configurations from the UE will be released. Thus, DRB setup will be needed, which will include SDAP-config, as clarified in the statements 3 and 4.

Therefore, the CN indication in the intra-LTE, intra-system and inter-system handovers may be utilized in the following scenarios:
1. When RRCConnectionReconfiguration message includes the fullConfig and SDAP-config, the target CN is 5GC;
2. When RRCConnectionReconfiguration message includes the fullConfig and no SDAP-config, the target CN is EPC; and
3. When RRCConnectionReconfiguration message does not include the fullConfig, the target CN is the same as the source CN.

Furthermore, an example of how to capture the CN indication behavior is given below:
1> if the RRCConnectionReconfiguration does not include the fullConfig:
  2> if the source CN is EPC:
    3> consider the target CN to be EPC;
  2> else:
    3> consider the target CN to be 5GC;
1> else if RRCConnectionReconfiguration includes the SDAP-config:
  2> consider the target CN to be 5GC;
1> else:
  2> consider the target CN to be EPC;
    1> if the handoverType in securityConfigHO is set to intraLTE:
      2> if the source CN is EPC and the target CN is EPC; or
      2> if the source CN is 5GC and the target CN is 5GC.

This particular embodiment is based on the presence or absence of the SDAP-Config to indicate the target CN, but any type of 5GC or EPC specific parameter, which is absent in the other CN, may also work as an indication of CN. For instance, eps-BearerIdentity is only present in EPC.

For the handover from LTE connected to EPC to LTE connected to 5GC, the UE may need an indication that it maps its current EPS security context to a 5GS security context. In some embodiments, the UE may also need an indication which AS and NAS security algorithms to use in the target eNB.

Regarding particular embodiments which use an inter-RAT option in handoverType in SecurityConfigHO to signal the NAS security parameters for the handover from EPC to 5GC, currently in LTE, the security parameters are provided by the target eNB in a RRCConnectionReconfiguration message. Since the network can only transmit the RRCConnectionReconfiguration message directly to the UE in case the handover is between two eNBs or within the same eNB, the handoverType in SecurityConfigHO is always set to intraLTE. However, in case of an inter-system handover from LTE connected to EPC to LTE connected to 5GC, the RRCConnectionReconfiguration message will be necessary to also include NAS security parameters including the NAS security algorithms and possibly a NAS security parameter required to derive new NAS keys.

This is similar to how a legacy inter-RAT handover to LTE from GERAN or UTRAN is done, where the nas-SecurityParamtToEUTRA contains the NAS security algorithms and a NONCE$_{MME}$ which is used as input for derivation of K$_{ASME}$. However, for the legacy inter-RAT handover from GERAN or UTRAN to LTE, the UE receives the RRCConnectionReconfiguration message via the other RAT.

As it has been proposed that the intra-LTE, inter-system handover may rely on the procedures defined for the legacy intra-LTE handover, the procedures would have to be improved to enable a transfer of the NAS security parameters for the intra-LTE case as well.

In some embodiments, for an intra-LTE, inter-system handover from LTE/EPC to LTE/5GC, the target ng-eNB would prepare the RRCConnectionReconfiguration message with the interRAT choice in the handoverType in the SecurityConfigHO. When the source eNB receives the RRCConnectionReconfiguration message, it forwards it to the UE.

TABLE 1

| Example Information Element | |
|---|---|
| SecurityConfigHO := | SEQUENCE { |
| handover Type | CHOICE { |
| intraLTE | SEQUENCE { |
| securityAlgorithmConfig | SecurityAlgorithmConfig OPTIONAL, - - Cond fullConfig |
| keyChangeIndicator | BOOLEAN, |
| nextHopChainingCount | NextHopChainingCount |
| }, | |
| interRAT | SEQUENCE { |
| securityAlgorithmConfig | Security Algorithm Config, |
| nas-Security Param ToEUTRA | OCTET STRING (SIZE(6)) |
| } | |
| }, | |
| ... | |
| } | |

When the UE receives the RRCConnectionReconfiguration message, the UE checks whether the handoverType is set to intraLTE or interRAT. If the handoverType is set to intraLTE, since the UE knows the source CN is EPC, the UE treats the handover as a legacy intra-LTE handover, i.e. LTE/EPC to LTE/EPC.

If instead the handoverType is set to interRAT, the UE considers the handover towards LTE/5GC. In case that the UE supports dual registration, i.e. simultaneously registered to EPS and 5GS, the UE notifies the NAS layers which activates a current 5GS security context or triggers an attach procedure, in case that it is the first time connecting to 5GS. Otherwise, if the UE does not support dual registration, but the network supports the interworking between the MME and the AMF via the N26 interface, the UE notifies the NAS layer that the EPS security context should be mapped to an 5GS security context. In either case, the UE applies the NAS security algorithms provided in the SecurityConfigHO. Since the NAS parameters required for 5GS are captured in the nas-SecurityParamToNGRAN as defined in TS 24.501, these parameters will be signalled in the legacy parameter nas-SecurityParamToEUTRA as they have the same size. However, when the UE receives the nas-SecurityParamToEUTRA when connecting to 5GS, the UE will interpret this parameter as an nas-SecurityParamToNGRAN.

As the legacy procedures for the intra-LTE handover do not allow the handoverType in SecurityConfig to be set to interRAT, if a UE receives the RRCConnectionReconfiguration message delivered directly with E-UTRA, i.e. not received via another RAT which is, for example, GERAN, UTRAN or CDMA, it deduces that the handover will be towards 5GC. Thus, the UE does not require the target CN indication which is illustrated in the particular embodiments of using existing parameters to indicate target core network.

Regarding particular embodiments which use existing parameters in SecurityConfigHO IE to indicate handover from 5GC to EPC, the target eNB would have to set the handoverType choice as intraLTE since the handover would appear as an inter-MME handover to the target MME. Since the handover is not intra-cell, the keyChangeIndicator will be set to false. In some embodiments, since the UE would derive a new $K_{eNB}$ based on the mapped $K_{ASME}$, the nextHopChainingCount (NCC) would be set to 2.

An example procedure for the particular embodiments may comprise the following steps:
1. The source ng-eNB decides that a UE should perform a handover to an eNB connected to EPC;
2. Since the CN has to change, the handover must be via the CN and not via X2 or Xn, the source AMF prepares the UE context, including a mapped EPS security context with the mapped $K_{ASME}$ and selected EPS NAS algorithms to be used in the target MME and derives the EPS NAS keys;
3. The source ng-eNB sends a Handover Required message to the source AMF, which includes the HandoverPreparationInformation that the will be transparently forwarded to the target eNB. In the HandoverPreparationInformation, the source eNB notifies the target eNB that the handover should apply fullConfig, e.g, by omitting any type of required information in the message or including NR configurations which would be incomprehensible to legacy eNBs or any other message extension which the target eNB wouldn't comprehend;
4. When the target eNB receives the Handover Request message from the target MME, the target eNB will perceive the handover as a S1-based handover and construct the RRCConnectionReconfiguration message accordingly. This means that the handoverType in SecurityConfigHO IE will be set to intraLTE. The SecurityConfigHO will include the AS SecurityAlgorithmConfig, the keyChangeIndicator set to false, and the NCC set to 2;
5. When the UE receives the RRCConnectionReconfiguration message, the UE will, based on an CN explicit or implicit CN indication disclosed in the present application, determine that the handover is from LTE/5GC to LTE/EPC. The UE will notify the NAS layer that the CN has changed from 5GC to EPC. The UE will also store the received NCC to be used in future key chaining; and
6. The NAS layer will then map the 5GS security context to an EPS security context in the same way as the AMF did. The UE will derive a new $K_{eNB}$ based on the mapped $K_{ASME}$.

Regarding particular embodiments which utilize a new IE in RRC message structure for intra-system and inter-system handovers in LTE, the new IE may indicate the target core network.

In some embodiments, instead of relying on the presence and/or absence of a combination of parameters, the target CN may be indicated explicitly with a new parameter in the RRC message. To be able to introduce the new parameter in the RRC message, the current RRC message needs to be extended. One option is to extend the RRCConnectionReconfiguration message as shown in Table 2 below.

TABLE 2

Example of RRCConnectionReconfiguration message

```
RRCConnectionReconfiguration-v1510-IEs ::= SEQUENCE {
    nr-Config-r15                    CHOICE {
      release                          NULL,
      setup                            SEQUENCE {
        endc-ReleaseAndAdd-r15         BOOLEAN,
        nr-Secondary CellGroupConfig-r15 OCTET STRING        OPTIONAL, -
- Need ON
        p-MaxEUTRA-r15                 P-Max                 OPTIONAL --
Need ON
      }
    }                                                        OPTIONAL, -- Need
ON
    sk-Counter-r15                   INTEGER (0 .. 65535)    OPTIONAL, --
Need ON
    nr-RadioBearerConfig 1-r15       OCTET STRING            OPTIONAL, --
Need ON
```

TABLE 2-continued

Example of RRCConnectionReconfiguration message

| | | |
|---|---|---|
| nr-RadioBearerConfig2-r15 | OCTET STRING | OPTIONAL, -- Need ON |
| tdm-PatternConfig-r15 | CHOICE { | |
|   release |   NULL, | |
|   setup |   SEQUENCE { | |
|     subframeAssignment-r15 |     SubframeAssignment-r15, | |
|     harq-Offset-r15 |     INTEGER (0.. 9) | |
|   } | | |
| } | | OPTIONAL, -- Need ON |
| nonCriticalExtension | SEQUENCE {RRCConnectionReconfiguration-vxx-IEs } | OPTIONAL |
| } | | |
| RRCConnectionReconfiguration-vxx-IEs ::= SEQUENCE { | | |
|   targetCN | ENUMERATED { 5GC } | OPTIONAL, - NEED OP |
|   nonCriticalExtension | SEQUENCE {} | OPTIONAL |
| } | | |

In some embodiments, the indication may be a single bit indicating that the target CN is 5GC, if the indication is present. If the parameter is absent, the target CN is EPC. This may allow legacy eNBs to construct the message without the need to understand the new parameter, since omitting the parameter implies the connection to EPC.

In some embodiments, the target CN indication may be included inside another extendable IE, e.g. SecurityConfigHO. An example of SecurityConfigHO is shown in Table 3 below.

TABLE 3

Example of SecurityConfigHO

| | |
|---|---|
| Security ConfigHO ::= | SEQUENCE { |
|   handoverType | CHOICE { |
|     intraLTE | SEQUENCE { |
|       securityAlgorithmConfig | SecurityAlgorithmConfig OPTIONAL, - Cond fullConfig |
|       keyChangeIndicator | BOOLEAN, |
|       nextHopChainingCount | NextHopChainingCount |
|     }, | |
|     interRAT | SEQUENCE { |
|       securityAlgorithmConfig | SecurityAlgorithmConfig, |
|       nas-SecurityParamToEUTRA | OCTET STRING (SIZE(6)) |
|     } | |
|   }, | |
|   ..., | |
|   [[ | |
|     targetCN | ENUMERATED { 5GC }   OPTIONAL, - NEED OP |
|   ]] | |
| } | |

In either case, the CN indication may be explicitly signaled in case of the connection to 5GC and implicitly inferred by the UE due to its absence in case of the connection to EPC.

In some embodiments, the target CN indication may consist of another data type than single valued enumerated, e.g. dual valued enumerated, Boolean, choice, sequence, or any other data type which allows signaling of two different alternatives.

Regarding particular embodiments which introduce a new IE to signal target CN and corresponding AS and NAS security parameters in intra-system and inter-system handovers in LTE, the new IE is introduced in a RRC message, instead of reusing the legacy SecurityConfigHO IE, e.g. SecurityConfigInterSystemHO. This new IE may be used to both indicate the target CN and to provide the security configurations. An example of SecurityConfigInterSystemHO is shown in Table 4 below.

TABLE 4

Example of SecurityConfigInterSystemHO

| | |
|---|---|
| SecurityConfigInterSystemHO ::= | SEQUENCE { |
|   securityAlgorithmConfig | SecurityAlgorithmConfig, |

TABLE 4-continued

Example of SecurityConfigInterSystemHO

| | |
|---|---|
|   nas-SecurityParamToNGRAN | OCTET STRING (SIZE(6)) |
|     OPTIONAL - Cond to5GC | |
|   } | |
| } | |
| ... | |
| } | |

In both directions, from LTE/EPC to LTE/5GC and LTE/5GC to LTE/EPC, the AS security algorithms need to be indicated to the UE. However, since the intra-LTE handover from 5GC to EPC may only require an indication from the AS layer to the NAS layer to trigger the mapping of the 5GS security context to the EPS security context, the new IE may contain a choice between a handover to EPC and a handover to 5GC. In some embodiments, the choice of the connection to EPC may contain a single bit to indicate the core network of EPC. In another embodiment, the target CN indication is placed in a separate IE outside the securityConfigInterSystemHO.

For the inter-system handover from LTE/EPC to LTE/5GC, the UE would require both the AS security algorithms in the SecurityAlgorithmConfig IE as well as the nas-SecurityParamToNGRAN. Thus, the new to 5GC choice of the new IE may contain the nas-SecurityParamToNGRAN. In some embodiments, the nas-SecurityParamToNGRAN may be called nas-Container.

If the UE receives the SecurityConfigInterSystemHO instead of the SecurityConfigHO, the UE knows that the handover will be towards the other RAT, i.e. towards 5GC if UE is connected to EPC and towards EPC if the UE is connected to 5GC. With this IE, the UE uses the reception of the SecurityConfigInterSystemHO as an indication that the CN should be changed, instead of the particular embodiments of using existing parameters to indicate the target CN. However, if the UE is connected to EPC, the UE also requires the NAS security parameters, which will only be included in the SecurityConfigInterSystemHO in case of handover from EPC to 5GC.

Regarding particular embodiments which utilize a reception of an RRCConnectionReconfiguration including the mobilityControlInfo by the UE, if the RRCConnectionReconfiguration message includes the mobilityControlInfo and the UE is able to comply with the configuration included in this message, the UE shall:
1> stop timer T310, if running;
1> stop timer T312, if running;
1> start timer T304 with the timer value set to t304, as included in the mobilityControlInfo;
1> stop timer T370, if running;
1> if the carrierFreq is included:
   2> consider the target PCell to be one on the frequency indicated by the carrierFreq with a physical cell identity indicated by the targetPhysCellId;
1> else:
   2> consider the target PCell to be one on the frequency of the source PCell with a physical cell identity indicated by the targetPhysCellId;
1> start synchronising to the DL of the target PCell;

In the above actions of UE, the UE should perform the handover as soon as possible following the reception of the RRC message triggering the handover, which could be before confirming successful reception (HARQ and ARQ) of this message.
1> if BL UE or UE in CE:
   2> if sameSFN-Indication is not present in mobilityControlInfo:
      3> acquire the MasterInformationBlock in the target PCell;
1> if makeBeforeBreak is configured:
   2> perform the remainder of this procedure including and following resetting MAC after the UE has stopped the uplink transmission/downlink reception with the source cell(s);

In the above actions of UE, it is up to UE implementation when to stop the uplink transmission and/or downlink reception with the source cell(s) to initiate re-tuning for connection to the target cell, if makeBeforeBreak is configured.

1> reset MCG MAC and SCG MAC, if configured;
1> re-establish PDCP for all RBs configured with pdcp-config that are established;

In the above actions of UE, the handling of the radio bearers is performed after the successful completion of the PDCP re-establishment, e.g. the re-transmission of unacknowledged PDCP SDUs as well as the associated status reporting. The handling of the SN and the HFN is specified in TS 36.323 [8].
1> re-establish MCG RLC and SCG RLC, if configured, for all RBs that are established;
1> configure lower layers to consider the SCell(s) other than the PSCell, if configured, to be in deactivated state;
1> apply the value of the new UE-Identity as the C-RNTI;
1> if the RRCConnectionReconfiguration message includes the fullConfig:
   2> perform the radio configuration procedure as specified in 5.3.5.8;
1> configure lower layers in accordance with the received radioResourceConfigCommon;
1> if the received RRCConnectionReconfiguration message includes the rach-Skip:
   2> configure lower layers to apply the rach-Skip for the target MCG, as specified in TS 36.213 [23] and 36.321 [6];
1> configure lower layers in accordance with any additional fields, not covered in the previous, if included in the received mobilityControlInfo;
1> if the received RRCConnectionReconfiguration includes the sCellToReleaseList:
   2> perform SCell release as specified in 5.3.10.3a;
1> if the received RRCConnectionReconfiguration includes the scg-Configuration; or
1> if the current UE configuration includes one or more split DRBs and the received RRCConnectionReconfiguration includes radioResourceConfigDedicated including drb-ToAddModList:
   2> perform SCG reconfiguration as specified in 5.3.10.10;
1> if the RRCConnectionReconfiguration message includes the radioResourceConfigDedicated:
   2> perform the radio resource configuration procedure as specified in 5.3.10;
1> if the RRCConnectionReconfiguration does not include the fullConfig:
   2> if the source CN is EPC:
      3> consider the target CN to be EPC;
   2> else:
      3> consider the target CN to be 5GC;
1> else if RRCConnectionReconfiguration includes the SDAP-config:
   2> consider the target CN to be 5GC;
1> else:
   2> consider the target CN to be EPC;
1> if the handoverType in securityConfigHO is set to intraLTE:
   2> if the source CN is EPC and the target CN is EPC; or
   2> if the source CN is 5GC and the target CN is 5GC:
      3> if the keyChangeIndicator received in the securityConfigHO is set to TRUE:
         4> update the applicable key ($K_{eNB}$ or $K_{gNB}$) based on the corresponding $K_{ASME}$ or $K_{AMF}$ key taken into use with the latest successful NAS SMC procedure, as specified in TS 33.401 [32] for $K_{eNB}$, and TS 33.501 [86] for $K_{gNB}$; 3> else:

4> update the applicable key ($K_{eNB}$ or $K_{gNB}$) based on the current key or the NH, using the nextHop-ChainingCount value indicated in the security-ConfigHO, as specified in TS 33.401 [32] for $K_{eNB}$, and TS 33.501 [86] for $K_{gNB}$;

In the above actions of UE, $K_{eNB}$ and $K_{ASME}$ are used when the target CN is EPC. $K_{gNB}$ and $K_{AMF}$ are used when the target CN is 5GC.

2> else:
   3> indicate to higher layer that the CN has changed from 5GC to EPC;
   3> derive the key $K_{eNB}$ based on the mapped $K_{ASME}$ key as specified for interworking between 5GS and EPS in TS 33.501 [86];

2 store the nextHopChainingCount value;

2> if the securityAlgorithmConfig is included in the securityConfigHO:
   3> derive the $K_{RRcint}$ key associated with the integrityProtAlgorithm, as specified in TS 33.401 [32];
   3> if connected as an RN:
      4> derive the $K_{Upint}$ key associated with the integrityProtAlgorithm, as specified in TS 33.401 [32];
   3> derive the $K_{RRCenc}$ key and the $K_{Upenc}$ key associated with the cipheringAlgorithm, as specified in TS 33.401 [32];

2> else:
   3> derive the $K_{RRcint}$ key associated with the current integrity algorithm, as specified in TS 33.401 [32];
   3> if connected as an RN:
      4> derive the $K_{Upint}$ key associated with the current integrity algorithm, as specified in TS 33.401 [32];
   3> derive the $K_{RRCenc}$ key and the $K_{Upenc}$ key associated with the current ciphering algorithm, as specified in TS 33.401 [32];

1> else:
   2> forward the nas-SecurityParamToEUTRA to the upper layers;

In the above actions of UE, the nas-SecurityParamToEUTRA may contain the parameter nas-SecurityParamToNGRAN if target CN is 5GC.

2> derive the key $K_{gNB}$, as specified in TS 33.501 [86];
2> derive the $K_{RRcint}$ key associated with the integrityProtAlgorithm, as specified in TS 33.401 [32];
2> derive the $K_{RRCenc}$ key and the $K_{Upenc}$ key associated with the cipheringAlgorithm, as specified in TS 33.401 [32];

1> configure lower layers to apply the integrity protection algorithm and the $K_{RRcint}$ key, i.e. the integrity protection configuration shall be applied to all subsequent messages received and sent by the UE, including the message used to indicate the successful completion of the procedure;

1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure;

1> if the received RRCConnectionReconfiguration includes the nr-Config and it is set to release; or 1> if the received RRCConnectionReconfiguration includes endc-ReleaseAndAdd and it is set to TRUE:
   2> perform ENDC release as specified in TS 38.331 [82, 5.3.5.x];

1> if the received RRCConnectionReconfiguration includes the sk-Counter:
   2> perform key update procedure as specified in in TS 38.331 [82, 5.3.5.8];

1> if the received RRCConnectionReconfiguration includes the nr-SecondaryCellGroupConfig:
   2> perform NR RRC Reconfiguration as specified in TS 38.331 [82, 5.3.5.5].

1> if the received RRCConnectionReconfiguration includes the nr-RadioBearerConfig1:
   2> perform radio bearer configuration as specified in TS 38.331 [82, 5.3.5.6];

1> if the received RRCConnectionReconfiguration includes the nr-RadioBearerConfig2:
   2> perform radio bearer configuration as specified in TS 38.331 [82, 5.3.5.6].

Figure 14:
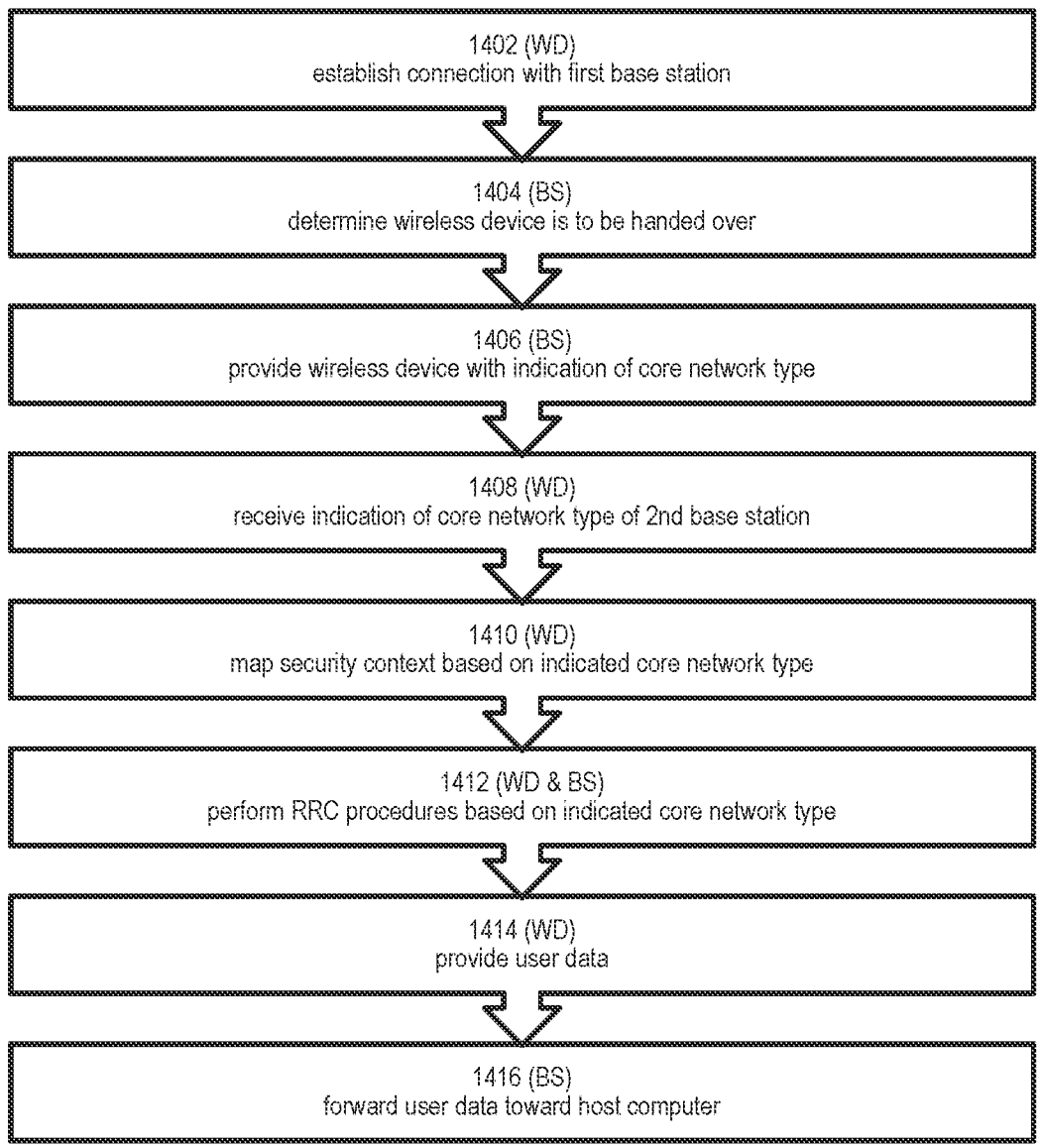
FIG. 14 illustrates a flow diagram of an example method, in accordance with certain embodiments.

FIG. 14 depicts a method in accordance with particular embodiments. The method includes steps performed by both a wireless device (WD) and a base station (BS). Other embodiments may include only steps from one or the other device. The depicted method begins at step 1402 with the wireless device establishing a wireless connection with a source base station.

At step 1404, a target base station determines that the wireless device is to be handed over to the target base station. In some embodiments, the target base station may determine whether the wireless device is to be handed over based on a message from the source base station.

At step 1406, the target base station provides the wireless device with an indication of the core network type used by the target base station. This indication is received by wireless device at step 1408. Depending on the scenario and/or embodiment, the indication may be implicit or explicit. Depending on the scenario and/or embodiment, the indication may be received via a legacy message or a new message. In one embodiment, the core network may be enhanced packet core (EPC) or 5G core (5GC).

At step 1410, the wireless device maps a security context for the target wireless connection based on the indicated core network type associated with the target base station.

At step 1412, the wireless device and the target base station perform RRC procedures based on the indicated core network type associated with the target base station.

At step 1414, the wireless device provides user data to the target base station. The target base station then forwards the user data to a host computer at step 1416.

Figure 15:
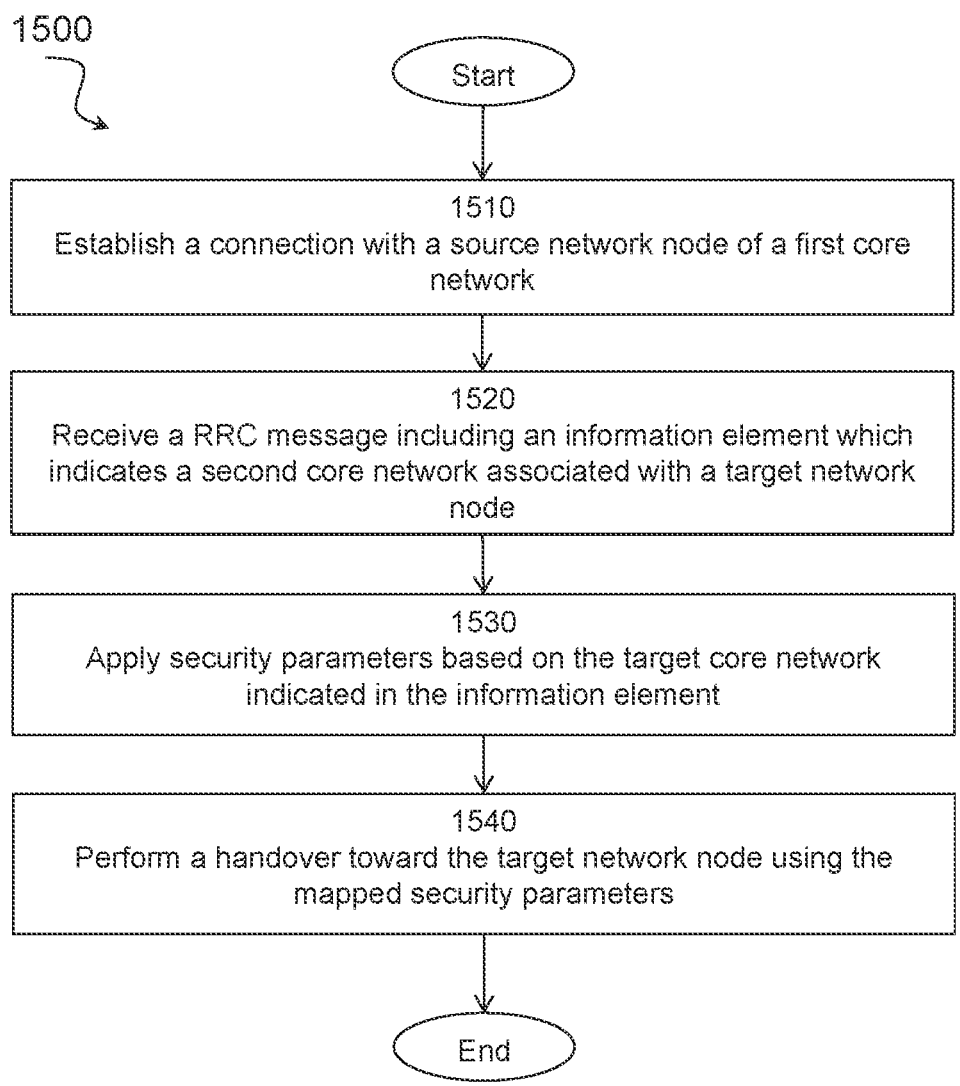
FIG. 15 illustrates a flow diagram of an example method performed at a user equipment, in accordance with certain embodiments.

FIG. 15 illustrates a flow diagram of an example method, in accordance with certain embodiments. The method 1500 may be performed by a UE or a WD. The UE may be the wireless device depicted in FIG. 5 or the user equipment shown in FIG. 6. The method 1500 begins at step 1510 with establishing a connection with a source network node of a first core network. In some embodiments, the source network node may be a network node shown in FIG. 5.

At step 1520, the method 1500 receives a RRC message including an information element. In some embodiments, the information element may indicate a second core network associated with a target network node. In some embodiments, the target network node may be a network node shown in FIG. 5. In some embodiments, the source network node and the target network node provide a first radio access network to a user equipment. The first radio access network may be LTE. In some embodiments, the first core network is 5GC and the second core network is EPC. In some embodiments, the first core network is EPC and the second core network is 5GC. In some embodiments, the RRC message including the information element may be received from the source network node.

At step 1530, the method 1500 applies security parameters based on the second core network indicated in the information element. In some embodiments, the applying step 1530 may comprise receiving an indication from an AS layer to a NAS layer, mapping 5GS security parameters to EPS security parameters, and applying the EPS security parameters. In some embodiments, the applying step 1530 may comprise receiving NAS security parameters included in the information element and applying the NAS security parameters.

At step 1540, the method 1500 performs a handover towards the target network node using the applied security parameters.

Figure 16:
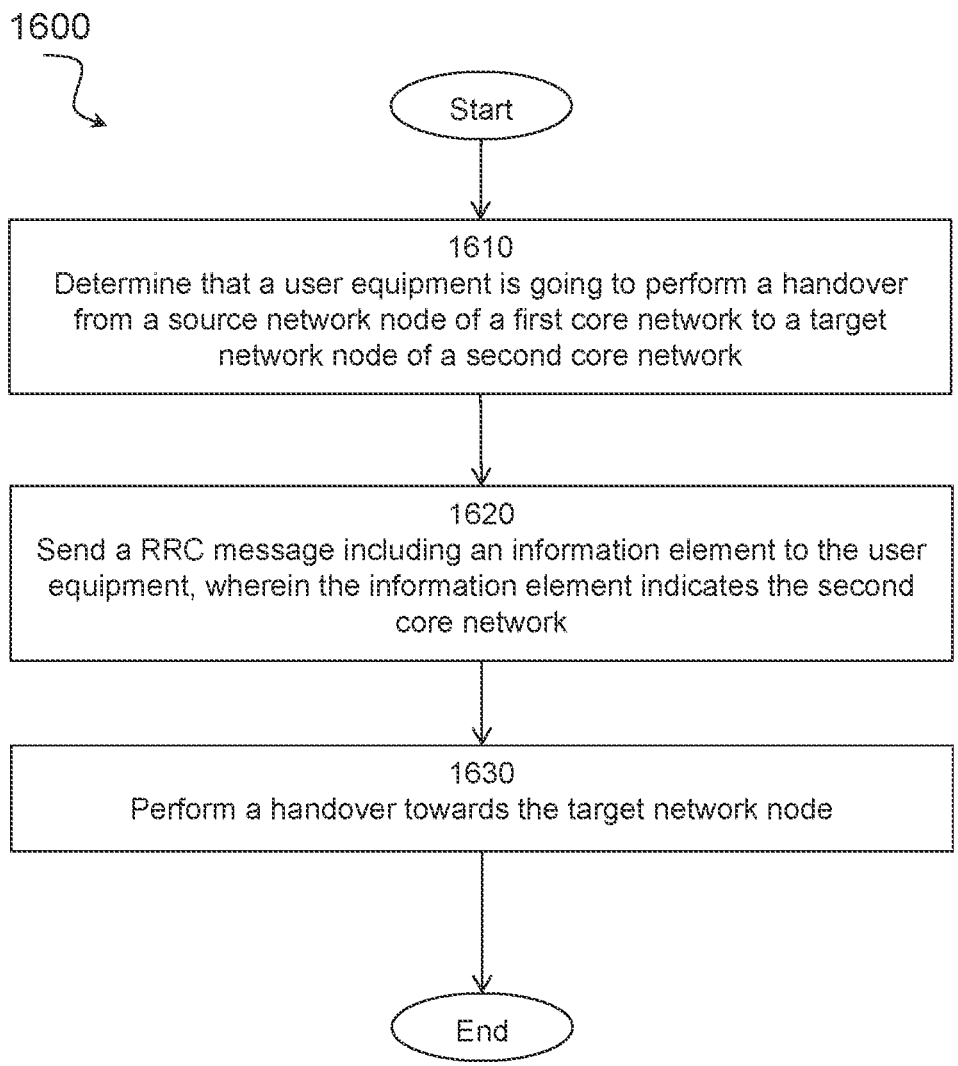
FIG. 16 illustrates a flow diagram of an example method performed at a network node, in accordance with certain embodiments.

FIG. 16 illustrates a flow diagram of another example method, in accordance with certain embodiments. The method may be performed by a network node. The network node may be the network node depicted in FIG. 5. Method 1600 begins at step 1610 with determining that a user equipment is going to perform a handover from a source network node of a first core network to a target network node of a second core network. In some embodiments, the determining step 1610 may comprise receiving a handover required message from the source network node to determine that the UE is going to perform the handover. In some embodiments, the source network node and the target network node may be a network node shown in FIG. 5. In some embodiments, the source network node and the target network node provide a first radio access network to a user equipment. The first radio access network may be LTE. In some embodiments, the first core network is 5GC and the second core network is EPC. In some embodiments, the first core network is EPC and the second core network is 5GC. In some embodiments, the RRC message including the information element may be sent from the source network node.

At step 1620, the method 1600 sends a RRC message including an information element to the user equipment. The information element indicates the second core network associated with the target network node. In some embodiments, the information element may further comprise NAS security parameters.

At step 1630, the method 1600 performs the handover towards the target network node.

Figure 17:
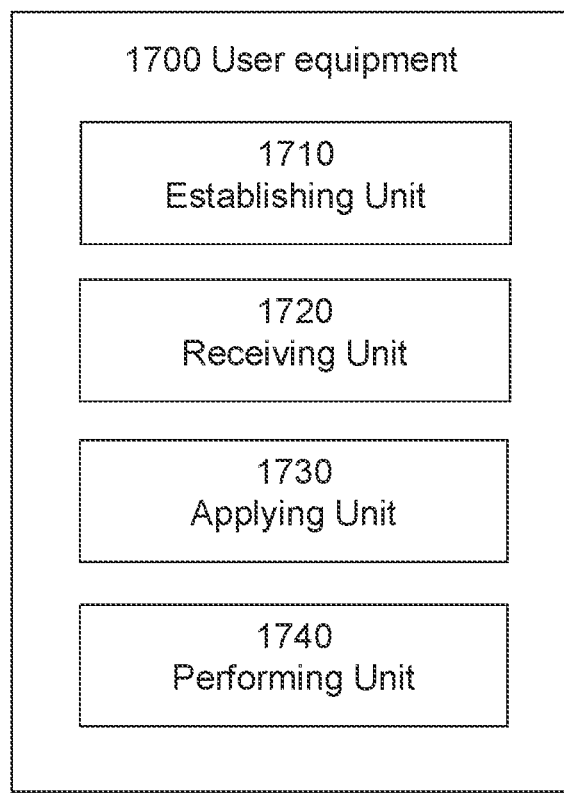
FIG. 17 illustrates a block schematic of an example user equipment and an example network node, in accordance with certain embodiments.

FIG. 17 is a schematic block diagram of an exemplary user equipment 1700, in accordance with certain embodiments. The user equipment 1700 may be used in a wireless network, e.g. the wireless network 506 shown in FIG. 5. In certain embodiments, the user equipment 1700 may be implemented in a wireless device 510 shown in FIG. 5. In certain embodiments, the user equipment 1700 may be the UE 600 shown in FIG. 6. The user equipment 1700 is operable to carry out the example methods described with reference to FIGS. 14 and 15 and possibly any other processes or methods disclosed herein. It is also to be understood that the method in FIGS. 14 and 15 are not necessarily carried out solely by user equipment 1700. At least some operations of the method can be performed by one or more other entities.

User equipment 1700 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1700 may be the processing circuitry 520 shown in FIG. 5. In some embodiments, the processing circuitry of user equipment 1700 may be the processor 601 shown in FIG. 6. The processing circuitry may be configured to execute program code stored in memory 615 shown in FIG. 6, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause establishing unit 1710, receiving unit 1720, applying unit 1730, and performing unit 1740, and any other suitable units of user equipment 1700 to perform corresponding functions according one or more embodiments of the present disclosure, such as a transmitter, a processor, and a receiver.

As illustrated in FIG. 17, user equipment 1700 includes the establishing unit 1710, the receiving unit 1720, the applying unit 1730, and the performing unit 1740. The establishing unit 1710 may be configured to establish a connection with a source network node of a first core network. In some embodiments, the source network node may be a network node shown in FIG. 5.

The receiving unit 1720 may be configured to receive a RRC message including an information element. In some embodiments, the information element may indicate a second core network associated with a target network node. In some embodiments, the target network node may be a network node shown in FIG. 5. In some embodiments, the source network node and the target network node provide a first radio access network to a user equipment. The first radio access network may be LTE. In some embodiments, the first core network is 5GC and the second core network is EPC. In some embodiments, the first core network is EPC and the second core network is 5GC. In some embodiments, the RRC message including the information element may be received from the source network node.

The applying unit 1730 may be configured to apply security parameters based on the second core network indicated in the information element. In some embodiments, the applying unit 1730 may receive an indication from an AS layer to a NAS layer, map 5GS security parameters to EPS security parameters, and apply the EPS security parameters. In some embodiments, the applying unit 1730 may receive NAS security parameters included in the information element and applying the NAS security parameters.

The performing unit 1740 may be configured to perform a handover towards the target network node using the applied security parameters.

Figure 18:
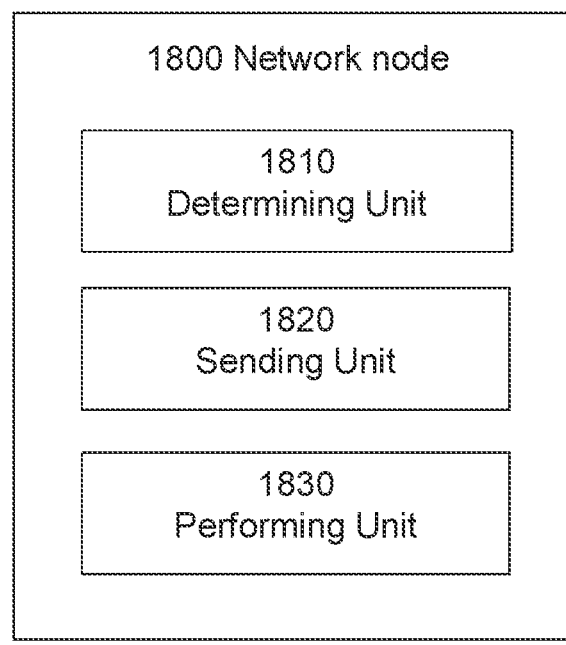
FIG. 18 illustrates a block schematic of an example network node, in accordance with certain embodiments.

FIG. 18 is a schematic block diagram of an exemplary network node 1800 in a wireless network, in accordance with certain embodiments. In some embodiments, the wireless network may be the wireless network 506 shown in FIG. 5. The network node may be the network node 560 shown in FIG. 5. The network node 1800 is operable to carry out the example method described with reference to FIGS. 14 and 16 and possibly any other processes or methods disclosed herein. It is also to be understood that the methods in FIGS. 14 and 16 are not necessarily carried out solely by the network node 1800. At least some operations of the method can be performed by one or more other entities.

Network node 1800 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1800 may be the processing circuitry 570 shown in FIG. 5. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1810, sending unit 1820, performing unit 1830, and any other suitable units of network node 1800 to perform corresponding functions according one or more embodiments of the present disclosure, such as a processor, a receiver, and a transmitter.

As illustrated in FIG. 18, network node 1800 includes the determining unit 1810, the sending unit 1820, and the performing unit 1830. The determining unit 1810 may be configured to determine that a user equipment is going to perform a handover from a source network node of a first core network to a target network node of a second core network. In some embodiments, the determining unit 1810 may perform the determination at the target network node based on a handover required message from the source network node. In some embodiments, the source network node and the target network node may be a network node shown in FIG. 5. In some embodiments, the source network node and the target network node provide a first radio access network to a user equipment. The first radio access network may be LTE. In some embodiments, the first core network is 5GC and the second core network is EPC. In some embodiments, the first core network is EPC and the second core network is 5GC. In some embodiments, the RRC message including the information element may be sent from the source network node.

The sending unit 1820 may be configured to send a RRC message including an information element to the user equipment. The information element indicates the second core network associated with the target network node. In some embodiments, the information element may further comprise NAS security parameters.

The performing unit 1830 may be configured to perform the handover towards the target network node.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that the UE may perform an intra-RAT, inter-system handover between LTE/EPC and LTE/5GC without extending the current RRC signaling by adding or modifying an information element in the RRCConnectionReconfiguration message. Particular embodiments of the present disclosure enable the UE to either infer or be told which CN the handover would be performed towards, using implicit or explicit target CN indications, and then the UE may take actions upon handover based on which direction the handover is. Particular embodiments of the present application provide the UE to differentiate between all different handover types and to perform appropriate actions to activate the NAS and the AS security in the target system.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for a handover procedure, comprising:
  establishing a connection with a source network node of a first core network type, wherein the source network node uses a first radio access technology (RAT);
  receiving a radio resource control (RRC) message including an information element, wherein the information element indicates a second core network type associated with a target network node, wherein the target network node uses the first RAT and the second core network type is different than the first core network type;
  applying security parameters based on the second core network type indicated in the information element; and
  performing a handover towards the target network node using the applied security parameters.

2. The method according to claim 1, wherein the first core network type is 5G Core Network (5GC) and the second core network type is Evolved Packet Core (EPC).

3. The method according to claim 2, wherein applying the security parameters comprises:
  receiving an indication from an access stratum (AS) layer to a non-access stratum (NAS) layer;
  mapping 5G System (5GS) security parameters to Evolved Packet System (EPS) security parameters; and
  applying the EPS security parameters.

4. The method according to claim 1, wherein the first core network type is Evolved Packet Core (EPC) and the second core network type is 5G Core Network (5GC).

5. The method according to claim 4, wherein applying the security parameters comprises:

receiving non-access stratum (NAS) security parameters included in the information element; and applying the NAS security parameters.

6. A method for a handover procedure, comprising:

determining that a user equipment is going to perform a handover from a source network node of a first core network type to a target network node of a second core network type, wherein the source network node and the target network node use a first radio access technology (RAT) and the second core network type is different than the first core network type;

sending a radio resource control (RRC) message including an information element to the user equipment, wherein the information element indicates the second core network type associated with the target network node; and performing the handover towards the target network node wherein security parameters applied during the handover are based on the second core network type.

7. The method according to claim 6, wherein the first core network type is 5G Core Network (5GC) and the second core network type is Evolved Packet Core (EPC).

8. The method according to claim 6, wherein the first core network type is Evolved Packet Core (EPC) and the second core network type is 5G Core Network (5GC).

9. The method according to claim 6, wherein the information element further comprises NAS security parameters.

10. The method according to claim 6, wherein determining that the user equipment is going to perform the handover comprises receiving a handover required message from the source network node.

11. A user equipment for a handover procedure, comprising:

at least one processing circuitry; and at least one storage that stores processor-executable instructions, when executed by the processing circuitry, causes a user equipment to:

establish a connection with a source network node of a first core network type, wherein the source network node uses a first radio access technology (RAT);

receive a radio resource control (RRC) message including an information element, wherein the information element indicates a second core network type associated with a target network node, wherein the target network node uses the first RAT and the second core network type is different than the first core network type;

apply security parameters based on the second core network type indicated in the information element; and perform a handover towards the target network node using the applied security parameters.

12. The user equipment according to claim 11, wherein the first core network type is 5G Core Network (5GC) and the second core network type is Evolved Packet Core (EPC).

13. The user equipment according to claim 11, wherein the first core network type is Evolved Packet Core (EPC) and the second core network type is 5G Core Network (5GC).

14. The user equipment according to claim 12, wherein applying the security parameters comprises:

receiving an indication from an access stratum (AS) layer to a non-access stratum (NAS) layer;

mapping 5G System (5GS) security parameters to Evolved Packet System (EPS) security parameters; and applying the EPS security parameters.

15. The user equipment according to claim 13, wherein applying the security parameters comprises:

receiving non-access stratum (NAS) security parameters included in the information element; and applying the NAS security parameters.

16. A network node for a handover procedure, comprising:

at least one processing circuitry; and at least one storage that stores processor-executable instructions, when executed by the processing circuitry, causes a source network node of a first core network type to:

determine that a user equipment is going to perform a handover to a target network node of a second core network type, wherein the source network node and the target network node use a first radio access technology (RAT) and the second core network type is different than the first core network type;

send a radio resource control (RRC) message including an information element to the user equipment, wherein the information element indicates the second core network type associated with the target network node; and perform the handover towards the target network node wherein security parameters applied during the handover are based on the second core network type.

17. The network node according to claim 16, wherein the first core network type 5G Core Network (5GC) and the second core network type is Evolved Packet Core (EPC).

18. The network node according to claim 16, wherein the first core network type is Evolved Packet Core (EPC) and the second core network type is 5G Core Network (5GC).

19. The network node according to claim 16, wherein the information element further comprises NAS security parameters.

* * * * *